United States Patent
Zhang et al.

(10) Patent No.: US 8,078,058 B2
(45) Date of Patent: Dec. 13, 2011

(54) ULTRA HIGH-SPEED ADAPTIVE AND ALL-OPTICAL METHOD FOR DATA PACKET RATE MULTIPLICATION COMPATIBLE WITH MULTIPLE DATA RATES

(75) Inventors: Jianguo Zhang, Xi'an Shanxi (CN); Wei Zhao, Xi'an Shanxi (CN); Xiaoping Xie, Xi'an Shanxi (CN)

(73) Assignee: Xi'an Institute of Optics and Precision Mechanics of Chinese Academy of Sciences, Xi'an Shanxi (CN)

( * ) Notice: Subject to any disclaimer, the term of this patent is extended or adjusted under 35 U.S.C. 154(b) by 489 days.

(21) Appl. No.: 12/306,353

(22) PCT Filed: Apr. 13, 2007

(86) PCT No.: PCT/CN2007/001220
§ 371 (c)(1),
(2), (4) Date: Dec. 23, 2008

(87) PCT Pub. No.: WO2008/043223
PCT Pub. Date: Apr. 17, 2008

(65) Prior Publication Data
US 2009/0238575 A1    Sep. 24, 2009

(30) Foreign Application Priority Data
Sep. 30, 2006   (CN) .......................... 2006 1 0104694

(51) Int. Cl.
*H04B 10/04*   (2006.01)
*G02B 6/26*   (2006.01)
*H04J 14/00*   (2006.01)
*H04B 10/00*   (2006.01)
*H04Q 11/00*   (2006.01)

(52) U.S. Cl. .............. 398/99; 398/98; 398/43; 398/183; 398/155; 385/15; 385/18

(58) Field of Classification Search ................... 398/99, 398/98, 43
See application file for complete search history.

(56) References Cited

U.S. PATENT DOCUMENTS
5,319,484 A  *  6/1994  Jacob et al. ..................... 398/75
(Continued)

FOREIGN PATENT DOCUMENTS
CN          1286550 A       3/2001
(Continued)

OTHER PUBLICATIONS
Patel "All-optical rate conversion" OFC '97 technical digest.*
(Continued)

*Primary Examiner* — Shi K Li
*Assistant Examiner* — Oommen Jacob
(74) *Attorney, Agent, or Firm* — Wong Cabello Lutsch Rutherford & Brucculeri LLP

(57) ABSTRACT

The present invention relates to an adaptive and all-optical method for data packet rate multiplication compatible with multiple data rates and/or multiple communication protocols. By performing a real-time pulse width compression on an original electronic or optical packet from an end user or a network interface device, the method generates an optical packet having an identical rate with the original packet while the duration of each pulse being significantly reduced. Then, by eliminating any redundant idle time due to the pulse width compression, the method also shortens data period and thus makes the rate of packet multiplied. The present invention addresses the technical problem of limited data rate in EO/OE conversion as known in the prior art and solves fundamentally the interconnection and communication between networks or systems of different data rates and/or protocols. The method of the present invention thus enables the design of an ultra-high rate all-optical communication system and network transparent in rate and protocol.

8 Claims, 13 Drawing Sheets

U.S. PATENT DOCUMENTS

| | | | |
|---|---|---|---|
| 5,339,186 A * | 8/1994 | Weverka | 398/53 |
| 6,650,800 B2 * | 11/2003 | Litvin | 385/15 |
| 6,731,877 B1 * | 5/2004 | Cao | 398/91 |
| 7,146,069 B1 * | 12/2006 | Bowers et al. | 385/18 |
| 7,236,707 B2 * | 6/2007 | Shahar | 398/140 |
| 7,835,649 B2 * | 11/2010 | Epps et al. | 398/155 |
| 2001/0053161 A1 * | 12/2001 | Tomizawa et al. | 370/538 |
| 2004/0208436 A1 * | 10/2004 | Hakimi et al. | 385/27 |
| 2004/0208635 A1 * | 10/2004 | Sinsky | 398/183 |
| 2005/0053329 A1 * | 3/2005 | Shahar | 385/27 |
| 2005/0161190 A1 * | 7/2005 | Iizuka et al. | 164/452 |
| 2005/0276613 A1 * | 12/2005 | Welch et al. | 398/172 |
| 2007/0086713 A1 * | 4/2007 | Ingmar et al. | 385/122 |
| 2007/0104451 A1 * | 5/2007 | Handelman | 385/147 |
| 2007/0242955 A1 * | 10/2007 | Kavehrad | 398/130 |
| 2008/0019705 A1 * | 1/2008 | Caplan et al. | 398/202 |
| 2009/0097854 A1 * | 4/2009 | Futami et al. | 398/98 |
| 2009/0289382 A1 * | 11/2009 | Lijana et al. | 264/1.37 |
| 2010/0021166 A1 * | 1/2010 | Way | 398/79 |
| 2010/0111120 A1 * | 5/2010 | Shah | 372/25 |
| 2010/0224794 A1 * | 9/2010 | Yajima et al. | 250/458.1 |
| 2010/0246611 A1 * | 9/2010 | Sun | 372/18 |
| 2011/0147621 A1 * | 6/2011 | Ohtake et al. | 250/504 R |
| 2011/0150465 A1 * | 6/2011 | Ito | 398/43 |

FOREIGN PATENT DOCUMENTS

| | | |
|---|---|---|
| EP | 1271993 A2 * | 1/2003 |
| EP | 1271993 A2 | 1/2003 |

OTHER PUBLICATIONS

Wang "Optical bit-rate conversion and bit-stream time reversal by the use of swept-carrier frequency-selective optical data storage techniques" Oct. 1, 1995 / vol. 20, No. 19 / Optics Letters 2033.*

PCT/CN2007/001220 Search Report.

* cited by examiner

_US 8,078,058 B2_

ULTRA HIGH-SPEED ADAPTIVE AND ALL-OPTICAL METHOD FOR DATA PACKET RATE MULTIPLICATION COMPATIBLE WITH MULTIPLE DATA RATES

BACKGROUND OF THE INVENTION

1. Field of Invention

The present invention relates to an adaptive and all-optical method for data packet rate multiplication compatible with multiple data rates and/or multiple communication protocols, which enables rapid and real-time information processing capability and can meet requirements of ultrahigh-speed operations. In particular, the present invention relates to an ultrahigh-speed adaptive and all-optical method for data packet rate multiplication compatible with multiple data rates.

2. Description of Prior Art

With the popularization of Internet as well as the constant growth of demands on multimedia communications and wideband services, various communication protocols and standards, such as ATM, SDH, various Ethernet protocols, and Fiber Channel protocol, have been established or improved. This brings great challenges to the design of communication networks and systems, since the designed communication networks/systems should be adaptively compatible with all types of existing communication protocols and standards. Also, it is desirable that these designs can flexibly support the application of any future communication protocol/standard and system upgrade.

However, for users with different rates and protocols, all of the current Internet and telecommunication systems process data packets (hereinafter, "data packet" is referred to as "packet") for transmission and exchange in the form of electronic signal, while transmit these packets in the form of optical signal. The specific steps comprise:

1) under the requirements of different communication protocols, such as ATM, SDH, various Ethernet protocols, and Fiber Channel protocol, processing the original user data or data from a communication network interface unit in the form of electronic signal, and packaging the data into electronic packets with a specified rate according to the specification of packet frame structure in the related communication protocol;

2) transmitting directly the packaged electronic packets via a cable, or transmitting optical packets obtained through electronic-to-optical (referred to as EO hereinafter) conversion from the electronic packets while maintaining the original frame structure and rate of the electronic packets;

3) if conversion between different data rates is required at some nodes of an optical network, performing the rate conversion in the electronic domain after the optical packets have been optical-to-electric (referred to as OE hereinafter) converted into electronic packets, and then conducting further communication after an EO conversion at the same rate.

The above method has a major drawback in that the packaging of electronic packets, EO conversion and OE conversion must be implemented in the electronic domain. However, the operating speed and bandwidth of most electronic devices and circuits are lower than those of optical devices, which leads to the problem of limiting the transmission rate of any communication network having signals processed in the electronic domain. This becomes a bottleneck for the transmission rate of such optical communication networks. For example, at present, the commercialized SDH optical fiber system has the highest rate of 40 Gb/s, while the maximum rate reaches only 10 Gb/s for a single wavelength in the commercialized optical Ethernet network. Although the identical-rate EO/OE conversion has been applied to such commercialized optical fiber transmission systems and communication networks as SDH system, Ethernet network, and dense WDM (DWDM) system/network, none of the optical fiber communication networks with electronic signal processing scheme can satisfy the rapid growing demand on IP data service due to the restriction of electronic bottleneck. Thus, none of them can support the increasing communication rate over the network. In addition, the adoption of such identical-rate EO/OE conversion limits the scalability of network and compatibility with any future ultrahigh-speed communication protocol.

With the commercialization of 40 Gb/s optical transmission systems and the study on 160 Gb/s optical communication systems, an ultrahigh speed and capacity communication network of all-optical transparent transmission and exchange, i.e., all-optical internet in a narrow sense, has become a target of future internet development. Since different end users or network interface devices may require different bandwidths and rates, one of the kernel techniques in designing an ultrahigh-speed all-optical internet is to realize an all-optical multi-rate interface so as to be adaptively compatible with user data of various rates. Such technique will have immediate effect on network scalability and operation flexibility. Currently, the following difficulties still exist in the realization of an ultrahigh-speed all-optical internet:

1) The low-rate optical packets need to be converted into optical packets at an ultrahigh rate and then be transmitted and exchanged. This requires a few, dozens or even thousands of times multiplication on the rate of the optical packets.

2) If the end users or network interface devices use different communication protocols, these different protocols must be complied with during the ultrahigh-speed multiplication of the optical packet rate. Further, the original frame structure in each communication protocol must be maintained after the rate multiplication.

3) If the end users or network interface devices each have optical packets of a different rate, compatibility must be considered during the ultrahigh-speed rate multiplication to transform various low-rate optical packets to the ultrahigh-rate optical packets required by the communication network.

4) All of the above processes must be adaptive.

SUMMARY OF THE INVENTION

The object of the present invention is to provide an ultrahigh-speed adaptive and all-optical method for data packet rate multiplication compatible with multiple data rates, which addresses the technical problem of limited data rate in EO/OE conversion as known in the prior art and achieves fundamentally the interconnection and communication between networks or systems of different data rates and/or protocols.

According to the present invention, there is provided an ultrahigh-speed adaptive and all-optical method for data packet rate multiplication compatible with multiple data rates, comprising steps of:

(1) Pulse width compression on low-rate data packet (1.1) generating an ultrashort optical pulse sample sequence, specifically, using an ultrashort-pulse laser source that can be synchronized with an external data clock to generate a periodic ultrashort optical pulse sample sequence at a repetition frequency of $B_i$ ($i \in \{1, 2, \ldots, n\}$), (1.2) subjecting an original low-rate electronic data packet and the periodic ultrashort optical pulse sample sequence at the repetition frequency of $B_i$ to ultrafast electrooptical sampling and then generating an original low-rate optical data packet which is based on ultrashort pulses and at a rate of $B_i$; or subjecting an original optical data packet and the periodic ultrashort optical pulse sample sequence at the repetition frequency of $B_i$ to all-optical sampling and then generating an original low-rate optical data packet which is based on ultrashort pulses and at a rate of $B_i$, (2) Selecting an adaptive rate multiplication factor (2.1) calculating a rate multiplication factor $RM_i$ $$RM_i = \frac{f_{op}}{B_i} \qquad (1)$$

where $i \in \{1, 2, \ldots, n\}$, and $f_{op}$ is the rate of an ultrahigh-rate optical data packet to be reached after the multiplication, (2.2) determining a time amount $\Delta T_i$ to be shorten for the original period $$\Delta T_i = \frac{1}{B_i} - \frac{1}{f_{op}} = (RM_i - 1)\tau \qquad (2)$$

where $$\tau = \frac{1}{f_{op}}$$

is the period of a compressed ultrahigh-rate optical data packet, (3) Compressing the period of the original low-rate optical data packet, specifically, compressing the period of the original low-rate optical data packet by an optical data packet rate multiplication unit according to the time amount $\Delta T_i$ to be shortened for the period as determined in Equation (2), so as to convert the low-rate optical data packet at the rate $B_i$ into a plurality of ultrahigh-rate optical data packets at the rate $f_{op}$, wherein only one of the plurality of ultrahigh rate optical data packets maintains an original correct frame structure, and the rest are of erroneous frame structure, (4) Acquiring the ultrahigh-rate optical data packet of the correct frame structure, specifically, screening out the ultrahigh-rate optical data packet of the correct frame structure at the output of the optical data packet rate multiplication unit with an optical gating signal.

The optical data packet rate multiplication unit may have an all-parallel structure, and is adapted to:

(1) split an input optical data packet having a rate of $B_i$, a pulse width of $\Delta P$ and a packet length of K bits into K paths, (2) inject the split signals into K parallel optical paths, respectively, and impose a delay on each path, the time delay $\Delta t_j^{(i)}$ for the jth optical path is $$\Delta t_j^{(i)} = (j-1)\Delta T_i \qquad (3)$$

where $j = 2, 3, \ldots, K$, wherein, the jth optical path in the all-parallel optical data packet rate multiplication unit is longer than a reference optical path by an optical distance $\Delta L_j^{(i)}$ $$\Delta L_j^{(i)} = \frac{c}{n}\Delta t_j^{(i)} \qquad (4)$$

$$= \frac{c\tau}{n}(j-1)(RM_i - 1)$$

where c is light velocity in vacuum, n is refractive index of optical waveguide material, $j=1, 2, \ldots, K$, and $i \in \{1, 2, \ldots, n\}$, wherein, the relative delay optical distance $\Delta L_{basic}^{(i)}$ between the jth optical path and the (j+1)th optical path is $$\Delta L_{basic}^{(i)} = \Delta T_i \times \frac{c}{n} \qquad (5)$$

where $j \in \{1, 2, \ldots, K-1\}$, (3) combine and output the K parallel optical paths.

The optical data packet rate multiplication unit may have an all-parallel structure. When inputted into the optical data packet rate multiplication unit, an optical data packet having the rate of $B_i$, the pulse width of $\Delta P$ and the packet length of K bits is first split into K paths by a passive optical splitter and then fed to the K parallel optical paths. The optical data packet on each of the optical paths is subjected to a delay determined by the time delay $\Delta t_j^{(i)}$ from Equation (3)

$$\Delta t_j^{(i)} = (j-1)\Delta T_i \qquad (3)$$

where $j = 2, 3, \ldots, K$. Then, the delayed K paths of optical data packets are inputted to a passive optical combiner and subjected to an interleaved superposition in time. Subsequently, an ultrahigh-rate optical pulse sequence is generated at the output of the optical data packet rate multiplication unit.

The optical data packet rate multiplication unit may have an all-parallel structure. The optical data packet rate multiplication unit multiplies each low-rate optical data packet by an active optical device, the input or output signal of each of the parallel optical paths contains only one ultrashort optical pulse, and a 1×K electrooptical switch is provided at the input of the optical data packet rate multiplication unit to split an input K-bit serial data into K parallel paths of single bit data signal. Alternatively, a passive optical splitter and a passive optical combiner are provided at the input and output stages of the all-parallel optical data packet rate multiplication unit, respectively, while K electrooptical intensity modulators or K simple electrooptical switches are provided on the K parallel optical paths between the input and output stages, respectively, to select K parallel paths of single bit data signal. The optical data packet rate multiplication unit outputs directly the optical data packet having a desired rate of $f_{op} = 1/\tau$ and length of K bits.

The optical data packet rate multiplication unit may have an all-serial structure, in which a jth stage of "split/combine" basic unit has a longer delay optical path than a reference optical path by a time delay $\Delta s_j^{(i)}$ $$\Delta s_j^{(i)} = 2^{j-1}\Delta T_i \qquad (6)$$

where $\Delta T_i$ is the time amount to be shortened for the period of the data packet of the rate $B_i$ as determined in Equation (2), and $j = 1, 2, 3, \ldots, M$;

the jth stage of "split/combine" basic unit has a longer delay optical path than the reference optical path by an optical distance $\Delta l_j^{(i)}$ $$\Delta l_j^{(i)} = \frac{c}{n}\Delta s_j^{(i)} \qquad (7)$$

$$= \frac{2^{j-1}}{n}(RM_i - 1),$$

where $i \in \{1, 2, \ldots, n\}$, and $j = 1, 2, \ldots, M$.

The optical data packet rate multiplication unit may have an all-serial structure, to the input of which an optical data packet having a rate of $B_i$, a pulse width of $\Delta P$ and a packet length of $K=2^M$ bits is inputted and multiplied by each stage of the "split/combine" basic units according to the time delay $\Delta s_j^{(i)}$ determined as $$\Delta s_j^{(i)} = 2^{j-1} \Delta T_i \quad (6)$$

where $\Delta T_i$ is the time amount to be shortened for period of the data packet of the rate $B_i$ as determined in Equation (2), and $j=1, 2, 3, \ldots, M$.

The optical data packet rate multiplication unit may have an all-serial structure, in which an electrooptical or all-optical time gate component is cascaded at the output of each stage of the "split/combine" basic units or at the output of each of some selected "split/combine" basic units; under the control of a gating signal, each of the electrooptical or all-optical time gate components eliminates timely any unwanted optical pulses or invalid "pairs of adjacent bits"/"groups of adjacent bits", which result from the optical process of "split-delay-combine", at relevant intermediate stages, and selects the desired "pairs of adjacent bits" or "groups of adjacent bits" and inputs them into next stage of "split/combine" basic unit.

The optical data packet rate multiplication unit may have a serial-parallel hybrid structure, in which the backbone is the parallel structure, one or more parallel optical path thereof being inserted with an all-serial optical data packet rate multiplication unit; or the backbone is the serial structure, an all-serial optical data packet rate multiplication unit and a parallel optical branch being connected in parallel at the output of the first stage of "split/combine" basic unit.

According to the present invention, by performing a real-time pulse width compression on an original electronic or optical packet from an end user or a network interface device, an optical packet, having an identical rate with the original packet while the duration of each pulse being significantly reduced, is generated. Then, by eliminating any redundant idle time due to the pulse width compression, it is possible to shorten the data period and thus to make the rate of packet multiplied. The method of the present invention enables the design of an ultrahigh-rate all-optical communication system and network transparent in rate and protocol. The advantages are listed as follows.

1. All-optical transparent. According to the present invention, in forming an ultrahigh-rate all-optical packet, it is possible to multiply a low-rate optical packet into a desired ultrahigh-rate optical packet without EO conversion or data storage and recombination.

2. Compatible with multiple protocols. A transparent compatibility with user data of different protocols may be achieved directly in an all-optical manner, for example, by generating ultrahigh-rate all-optical IP packets, ATM packets, Ethernet packets, and Fiber Channel packets.

3. Compatible with multiple rates. A transparent compatibility with packets based on ultrashort optical pulses at various rates of Kb/s, Mb/s, Gb/s, etc may be achieved directly in an all-optical manner.

According to the present invention, it is possible to achieve a transparent compatibility with packets of different interface rates from Kb/s to Gb/s in the manner of all-optical signal processing. The low-rate optical packets obtained from sampling with the ultrashort optical pulse periodic signal are converted into the desired ultrahigh-rate optical packets by the adaptive all-optical rate multiplication technique. After such rate uplift, the optical packets to be transmitted at all interfaces of the all-optical network have the optical signal transmission rate specified by the all-optical communication network. Then, the ultrahigh-rate optical packets are sent by respective optical interface unit into the all-optical network for real-time transmission and exchange. From the perspective of engineering applications, this contributes to design a general optical communication network and system, to reduce their manufacture and operation cost, and to promote popularization of the optical network and system.

4. Maintaining the data frame structure of original protocol. That is, the ultrahigh-rate optical packet may maintain the same frame structure as that of the original low-rate optical packet, even after the rate multiplication.

According to the present invention, it is possible to directly achieve a compatibility with end user data of different frame structures or data of network interface devices under different protocols, such as IP packet, ATM packet, 10 Mb/s Ethernet packet, fast Ethernet/Gb Ethernet/10 Gb Ethernet packet, fiber channel packet, etc. The ultrahigh-rate optical packet required by the all-optical communication network is generated through the rate multiplication while maintaining the same frame structure as that of the original low-rate optical packet.

5. Rate multiplication by a large multiple. Consider that the rate of the original packet is $B_L$, and the rate of all-optical packet is $B_H$ after the rate multiplication, the rate multiplication factor RM for the packet is $$RM = \frac{B_H}{B_L}.$$

The rate of the packet may be increased by a multiple of $10^1$-$10^8$ as required by the network.

6. Selectable multiple for rate multiplication. That is, the rate multiplication factor RM for the packet may be selected adaptively according to network requirement.

According to the present invention, it is possible to perform a rate-transparent ultrafast multiplication directly in the optical domain on the low-rate optical packets obtained from sampling with the ultrashort optical pulse periodic signal. After such processing, the low-rate optical packets having a rate in order of Kb/s to Gb/s may be multiplied to have a rate of 100 Gb/s, 160 Gb/s, 320 Gb/s, 500 Gb/s, 640 Gb/s or even higher rate according to requirement of network transmission capacity, and then are sent to the fiber network for transmission and exchange at an ultrahigh speed.

7. Flexible Adaptive Operation.

During the ultrahigh-speed rate multiplication of optical packets, the present invention requires no manual adjustment but an adaptive operation via flexible and automatic electronically controlled programming, especially suitable for flexible and fast networking of the all-optical network.

8. Wide Range of Application.

The present invention can not only be applied to terrestrial civilian and military ultrahigh-rate all-optical communication networks and systems but also support ultrahigh-rate optical interconnections for further ultrahigh-rate optical satellite communication networks, aviation fiber networks and marine fiber networks.

DETAILED DESCRIPTION OF PREFERRED EMBODIMENTS

Figure 1:
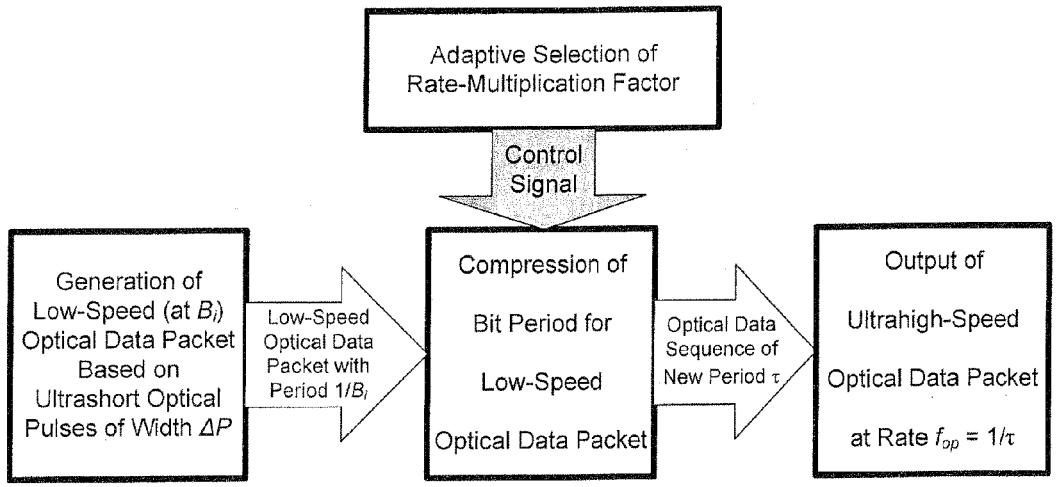
FIG. 1 is a schematic diagram showing the principle of an ultrahigh-speed adaptive and all-optical method for data packet rate multiplication compatible with Multiple data rates according to the present invention.

The present invention provides an adaptive and all-optical method for data packet rate multiplication compatible with "multiple data rates and/or multiple communication protocols", which, as shown in FIG. 1, includes mainly four functional blocks for (1) generating a low-rate optical packet based on ultrashort optical pulses, (2) adaptively selecting an rate multiplication factor, (3) compressing the period of the low-rate optical packet, and (4) forming an ultrahigh-rate optical packet. For a convenient explanation, assumption is made that all the low-rate optical packets to be rate-multiplied have n different data rates of $B_i$ (i=1, 2, ..., n), all the ultrahigh-rate optical packets formed after the rate multiplication have one uniform data rate of $f_{op}$, and the width of the ultrahigh-rate optical pulses is $\Delta P$. In this case, the period of the optical signals is $T_{op}=1/f_{op}$, which is often called "time slot" width $\tau$ of the ultrahigh-rate optical pulses. Here, $\Delta P$ should be smaller than $\tau$ in order to suppress intersymbol interferences.

The technical principle of the present invention is described below.

1. First the pulse width of a conventional low-rate packet is compressed. After such processing, the original electronic or optical packet of rate $B_i$ is converted into a low-rate optical packet having the rate $B_i$ and a very narrow pulse width. In other words, after the pulse width compression, each bit in the optical packet occupies only a minute fraction of a period, and the remaining large fraction $(1/B_i-\tau)$ of the period is in an idle state.

2. The rate multiplication factor $RM_i$ for the packet is adaptively calculated according to the rate $B_i$ of the original packet and the rate $f_{op}=1/\tau$ to be reached after the multiplication. Here the rate multiplication factor $RM_i$ may be any value greater than 1.

$$RM_i = \frac{f_{op}}{B_i}, \quad (1)$$
$$i \in \{1, 2, \ldots, n\}$$

Then, a time amount to be shortened for the original period is determined as $$\Delta T_i = \frac{1}{B_i} - \frac{1}{f_{op}} = (RM_i - 1)\tau, \quad (2)$$
$$i \in \{1, 2, \ldots, n\}$$

3. An ultrafast temporal compression process is effected with optical technologies according to the time amount determined in Equation (2). As a result, any idle time in each period may be deleted so that the data sequence based on the ultrashort optical pulses has a new period of $T_{op}=\tau$. In this way, the data rate may be raised to the desired value $f_{op}$.

4. Depending on the types and system structures of optical devices used in the all-optical packet rate multiplication unit or subsystem, if the signal at the input to the rate multiplication unit is a low-rate optical packet based on ultrashort optical pulse, the optical signal outputted from the unit may contain only an ultrahigh-rate optical packet corresponding to the original packet, that is, the rate multiplication unit can output the desired signal directly. Further, the output of the all-optical packet rate multiplication unit may contain not only the ultrahigh-rate optical packet exactly corresponding to the original packet but also other ultrashort optical pulse sequence patterns, i.e., unwanted signals. In this case, the rate multiplication unit should be cascaded with an optical device or subsystem having a gating function. Under the control of a gating signal, only the ultrahigh-rate optical packet exactly corresponding to the original packet is allowed to appear at the output of the all-optical packet rate multiplication unit, while other unwanted ultrashort optical pulse sequences are eliminated The present invention is implemented in the following steps.

Pulse width compression on low-rate data packet

Figure 2:
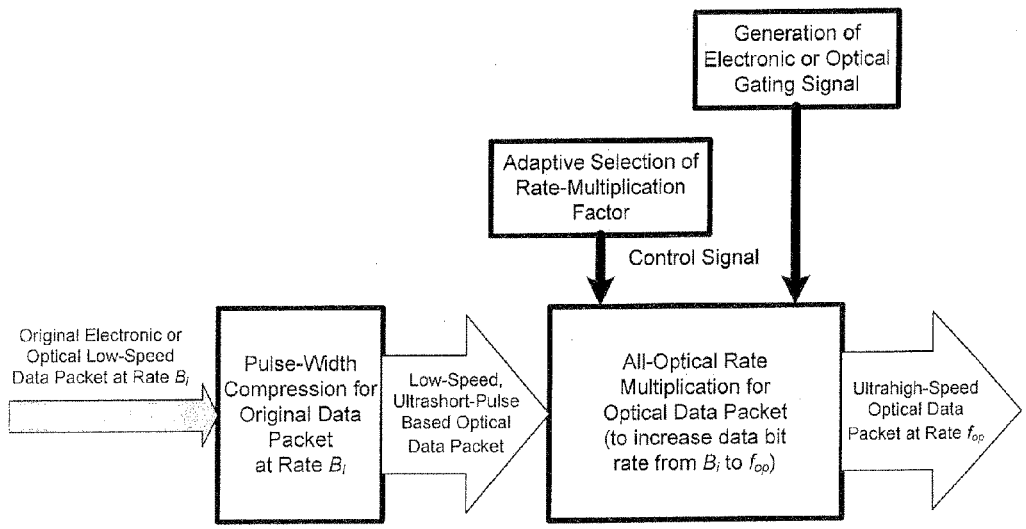
FIG. 2 is a schematic diagram showing an embodiment of the present invention.

Compared with the multiplied rate $f_{op}$ of the optical packet, the original packet generally has a lower rate $B_i$ (1, 2, ..., n) and a larger pulse width. Further, depending on the position where the all-optical packet rate multiplication unit is used in the network, the original packet at its input may be an electronic signal or an optical signal, as shown in FIG. 2. Some electrooptical or all-optical devices are required for converting the electronic or optical signal of a wide pulse into a signal of a very narrow optical pulse. One of the existing solutions is to use ultrafast electrooptical or all-optical sampling technique, the principle of which is described below.

1.1 Generation of an ultrashort optical pulse sample sequence, that is, using an ultrashort-pulse laser source that can be synchronized with an external data clock to generate a periodic ultrashort optical pulse sample sequence at a repetition frequency of $B_i$ (i∈{1, 2, ..., n}).

The ultrashort-pulse laser source may be an active mode-locked laser, a gain switching laser or a continuous wave (CW) laser, cascaded with an electronic absorption modulator or any other type of electrooptical intensity modulator. It is preferred that the pulse width of the ultrashort optical pulse is less than 10 ps so that it can be used in the ultrahigh-speed all-optical packet rate multiplication.

Figure 3:
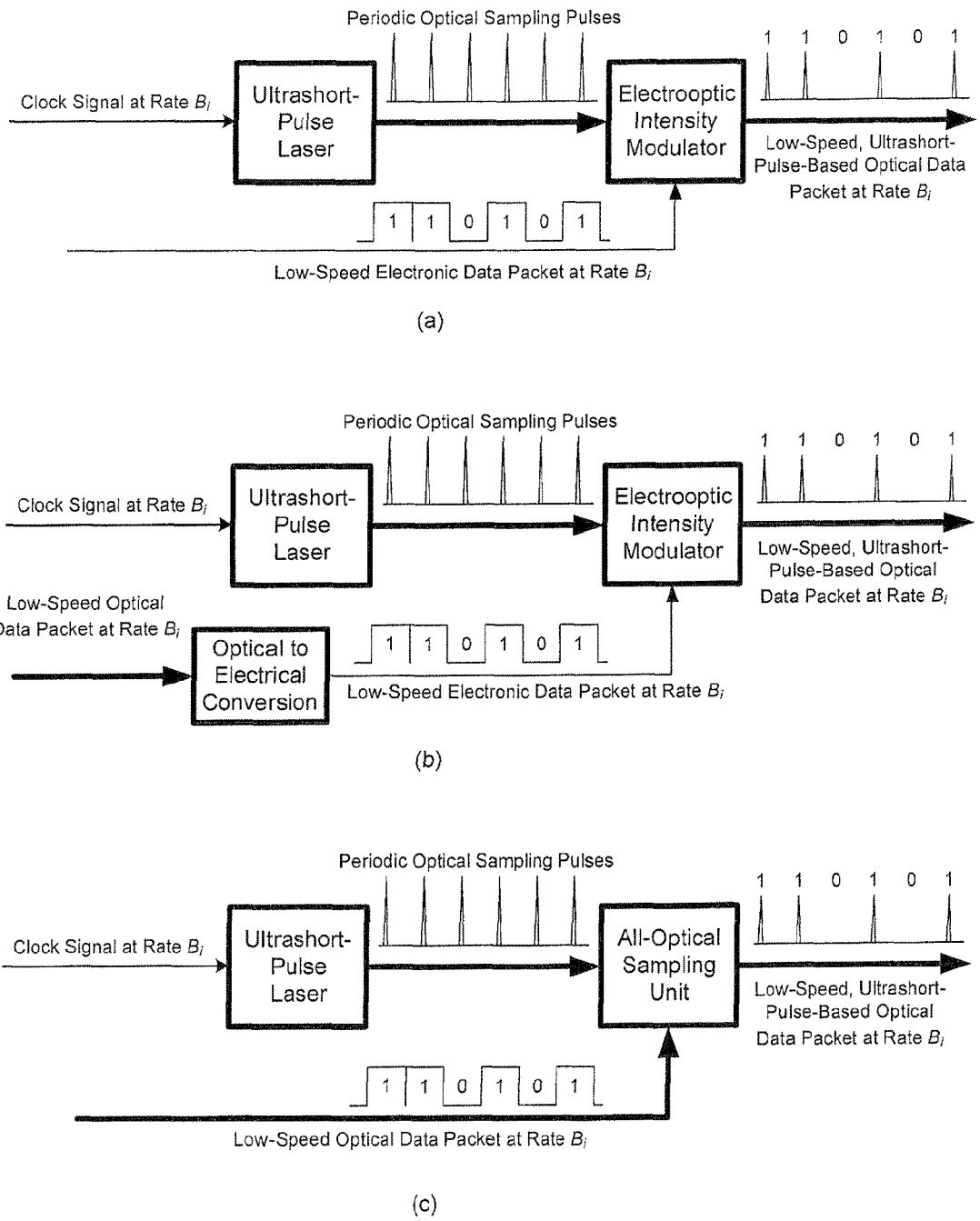
FIG. 3 is a schematic diagram showing the principle of pulse width compression on low-rate packets according to the present invention.

1.2 Electrooptical sampling, that is, inputting the original low-rate electronic packet and the periodic ultrashort optical pulse sample sequence at the repetition frequency of $B_i$ to an electrooptical intensity modulator, performing electrooptical sampling and then generating an original low-rate optical packet which is based on ultrashort pulses and at a rate of $B_i$, as shown in FIG. 3(a).

Generally, the electrooptical intensity modulator may be a $LiNbO_3$ intensity modulator or an electronic absorption modulator. The low-rate electronic packet may be at any rate, for example, in the order of Kb/s, Mb/s or Gb/s. And the frame structure of the low-rate electronic packet may be any frame structure, for example, provisioned in IP, ATM or Ethernet protocol.

If the original optical packet to be rate multiplied has a low rate $B_i$, it is first subjected to OE conversion to form a low-rate original electronic packet, and then to electrooptical sampling to generate the low-rate optical packet which is based on ultrashort pulses and at the rate of $B_i$, as shown in FIG. 3(b). In such method, the structure is simple, the used optical devices are well-established, and thus the method is easy to implement in the prior art. On the other hand, the dominant drawback of this method is the bottleneck effect due to OE conversion, which limits the speed of data processing. With the popularization of all-optical communication networks and the constant growth of the interface rate for optical networks, an all-optical sampling technique is required to overcome the bottleneck due to OE conversion.

1.3 All-optical sampling, that is, inputting the original optical packet and the periodic ultrashort optical pulse sample sequence at the repetition frequency of $B_i$ to an all-optical sampling component, performing ultrafast optical sampling and then generating an original optical packet which is based on ultrashort pulses and at a rate of $B_i$, as shown in FIG. 3(c).

The all-optical sampling component may be realized in various forms. For example, it may be an ultrafast optical logic AND gate or an ultrafast and ultranarrow optical time gate. The ultrafast optical sampling may be performed using non-linear optical effects in all kinds of fibers or semiconductor optical devices. Generally speaking, the all-optical sampling component based on fiber is easy to realize and very fast in operation, while it has a larger size, impairing compactness and integration. The all-optical sampling component based on semiconductor device is small in size and simple in integration, while it requires a higher cost than that based on fiber. The all-optical sampler, comprising only a single semiconductor optical device, has a simple structure and implementation, while its operating speed is limited by the carrier recovery time in the semiconductor optical device. To address such problem, the all-optical sampler may use more than one semiconductor optical device and enable ultrafast optical sampling through appropriate structuring, for example, placing a semiconductor optical amplifier in an interferometer type structure in order to improve operating speed.

2. Adaptive Selection of Rate Multiplication Factor

There are n different data rates $B_i$ (i=1, 2, ..., n) in total for the original packets to be rate multiplied within the same network. Thus, the all-optical packet rate multiplication unit must adaptively determine the time amount to be shortened for the original period based on the current packet rate at the input. Then, corresponding control information is sent to the all-optical packet rate multiplication unit to automatically select a proper optical distance and obtain the desired rate multiplication factor.

2.1 Adaptive calculation of the current rate multiplication factor $RM_i$, where i∈{1, 2, ..., n}, through Equation (1). As can be seen from Equations (1) and (2), for a given optical communication network transmission rate $f_{op}=1/\tau$, one rate multiplication factor $RM_i$ corresponds to one time amount $\Delta T_i$ to be shortened for the original period. In other words, the corresponding time amount $\Delta T_i$ may be determined once the rate multiplication factor $RM_i$ is calculated.

2.2 The corresponding time delay control signal is generated according to the calculated $RM_i$, where i∈{1, 2, ..., n}, and then sent to the all-optical packet rate multiplication unit to build a proper optical distance adaptively.

3. Compression of Period of Low-Rate Optical Packet

The optical packet obtained after the pulse width compression has a lower rate $B_i$, while the data transmission rate $f_{op}$ on the all-optical communication network is higher. Thus, the all-optical rate multiplication unit is required at the interface between each end user and the fiber network or at some nodes of the optical network to convert low-rate optical packets into ultrahigh-rate optical packets, as shown in FIG. 2. Then, the optical packets having the uniform rate $f_{op}$ are provided to the network for transmission and exchange. As such, the all-optical packet rate multiplication technique serves as one of the core techniques for realizing an ultrahigh-speed all-optical switched network compatible with multiple rates and multiple frame structures.

An ultrafast optical packet rate multiplication unit is required in compression of optical period. Such rate multiplication unit is generally formed in the following three structures. For a clear explanation of its operating principle, assumption is made that one original packet contains K bits.

3.1 All-Parallel Structure

Figure 4:
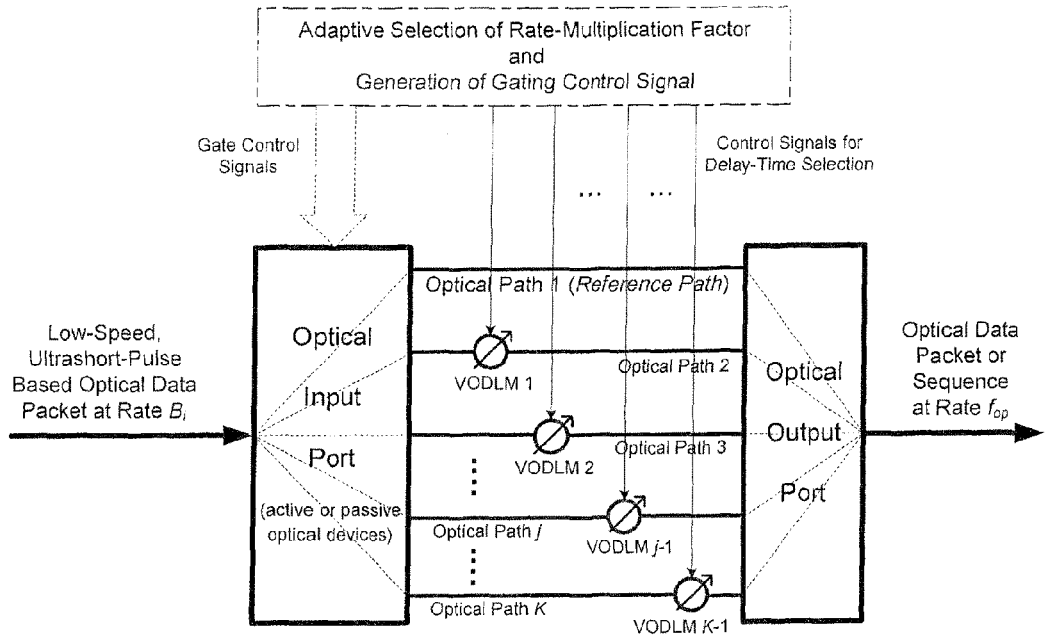
FIG. 4 is a schematic diagram showing the principle of an optical packet rate multiplication unit of an all-parallel structure according to the present invention.

As one of the important features of the optical packet rate multiplication unit having an all-parallel structure, there are K parallel optical paths. The optical packet rate multiplication unit may be classified into two categories of basic and refined, depending on the types and functions of the used optical devices. With respect to an input optical packet having the rate $B_i$ and the shortened pulse width $\Delta P$, the all-parallel optical packet rate multiplication unit first splits the input optical packet into K paths, and injects them into the K parallel optical paths, respectively, for further delay processing. For a convenience description of its operating principle, it is assumed that the first optical path acts as a "reference optical path", the function of which is to locate the last bit in the low-rate optical packet to the Kth time slot in the ultrahigh-rate optical packet to be generated, as shown in FIG. 4. Based on the assumption, the second and third optical paths should be longer than the first path by time delays $\Delta T_i$, $2\Delta T_i$, respectively, so as to respectively locate the last but one bit and the last but two bit in the low-rate optical packet to the (K−1)th, (K−2)th time slots in the ultrahigh-rate optical packet to be generated. These bits are arranged at the same time interval $\tau$ after the delay processing. Similarly, the jth optical path should has a time delay $\Delta t_j^{(i)}$ over the first path, where $$\Delta t_j^{(i)} = (j-1)\Delta T_i, j=2, 3, \ldots, K \quad (3)$$

$\Delta T_i$ is the time amount to be shortened for the period of the data at the rate $B_i$, as calculated in Equation (2). As a result, the K-bit optical data signal obtained after the above relocation has a new period $\tau$ as well as one-to-one correspondence with the input optical packet. In this way, it is possible to select the desired optical packet of rate $f_{op}=1/\tau$ and K-bit length only by proper control over the optical packet rate multiplication unit. That is, the optical packet rate multiplication unit outputs only one ultrahigh-rate optical packet exactly corresponding to the input optical packet, and thus fulfills the desired rate multiplication.

Figure 5:
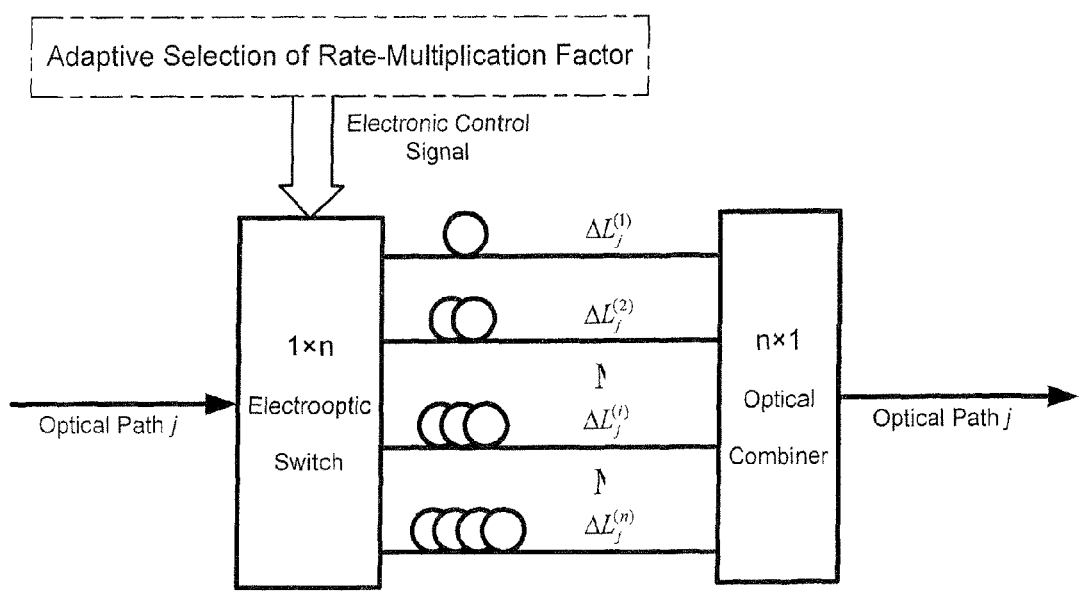
FIG. 5 a block diagram showing a variable optical delay line module (VODLM) that is programmable and electronically controllable according to the present invention.

In order to enable adaptive rate multiplication of the optical packet, the (K−1) parallel optical paths of the optical packet rate multiplication unit other than the "reference optical path" each must have a length (called optical distance) which can be adjusted according to the change in the rate ($B_i$) of the input optical packet. Thus, a circuit for adaptively selecting an rate multiplication factor should first generate an optical distance selection control signal based on the calculated $RM_i$. Then, the circuit sends the control signal to control each of (K−1) variable optical delay line modules (VODLMs) for automatically selecting the desired time delays and thus generating (K−1) required optical distances. If there are n different data rates $B_i$ in total for the low-rate optical packet to be rate multiplied, the jth VODLM can adaptively generate any one of the n required optical distances according to the state of the applied control signal, as shown in FIG. 5.

With Equations (2) and (3), the jth optical path should have an additional optical distance $\Delta L_j^{(i)}$, where $j=1, 2, \ldots, K$, over the first path, i.e., the reference optical path, $$\Delta L_j^{(i)} = \frac{c}{n}\Delta t_j^{(i)} \quad (4)$$
$$= \frac{c\tau}{n}(j-1)(RM_i - 1),$$
$$i \in \{1, 2, \ldots, n\}$$

where c is light velocity in vacuum, n is refractive index of optical waveguide material. For example, n=1.5 for common mono-mode fibers. The value $f_{op}$ is generally preset in design of an optical communication network, such as 100 Gb/s, 160 Gb/s or 320 Gb/s. Thus, from the Equation (4), for a given jth optical path, $\Delta L_j^{(i)}$ is just a function of the rate multiplication factor $RM_i$. In addition, the relative delay optical distance $\Delta L_{basic}^{(i)}$, where $j \in \{1, 2, \ldots, K-1\}$, between the jth and (j+1)th optical paths is determined only by the time amount to be shortened for the original period.

$$\Delta L_{basic}^{(i)} = \Delta T_i \times \frac{c}{n} \quad (5)$$

Figure 6:
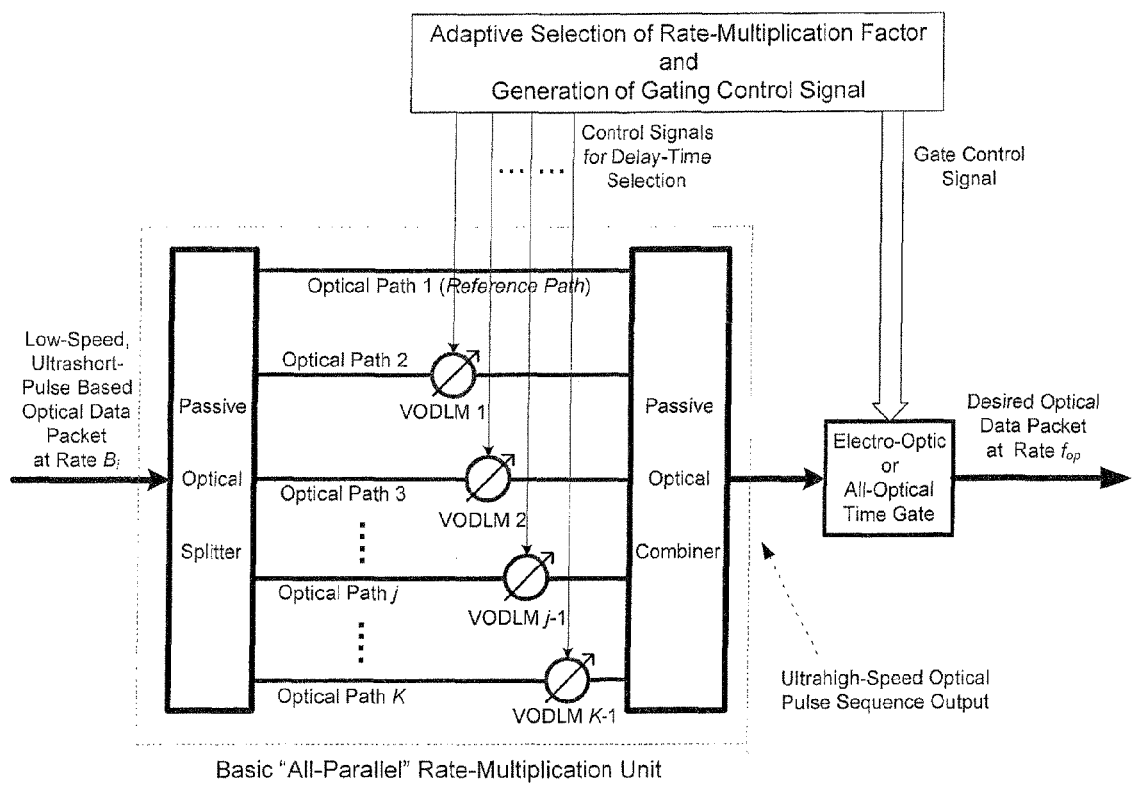
FIG. 6 is a schematic diagram showing a basic "all-parallel" rate multiplication unit according to the present invention.
Figure 7:
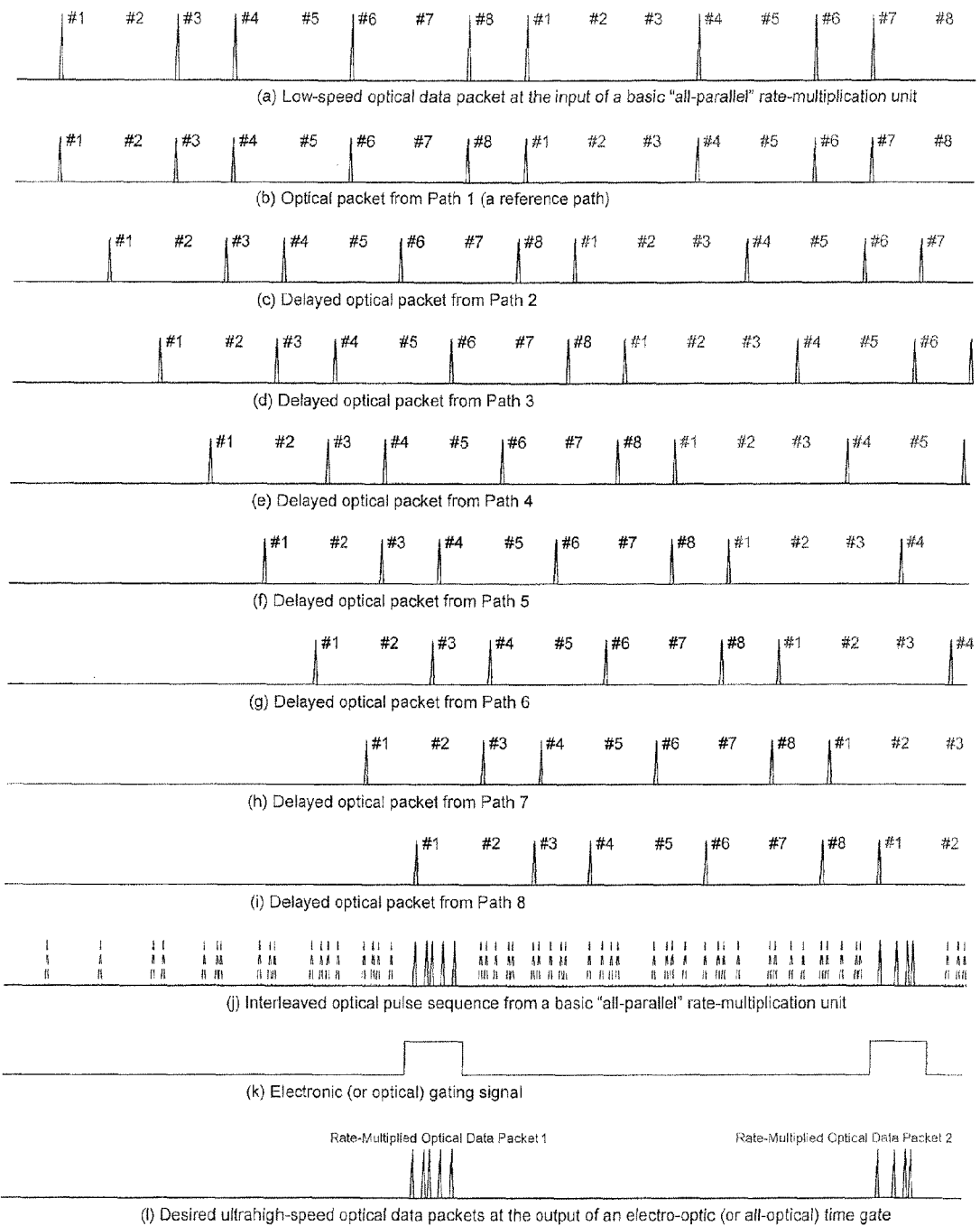
FIG. 7 is a schematic diagram showing a process of forming ultrahigh-rate optical packets by an improved "serial" rate multiplication unit according to the present invention.

3.1.1 Basic Optical Packet Rate Multiplication Unit of All-Parallel Structure In addition to the VODLMs, the basic optical packet rate multiplication unit of all-parallel structure comprises passive optical devices, as shown in FIG. 6. When inputted to the basic optical packet rate multiplication unit, the optical packet having the rate of $B_i$, the pulse width of $\Delta P$ and the packet length of K bits is first split into K paths of signals by a passive optical splitter and fed into the K parallel optical paths. The optical packet on each optical path is processed according to the time delay $\Delta t_j^{(i)}$ calculated in Equation (3), as shown in FIG. 7. After that, these K paths of optical packets after the above delay processing are inputted to a passive optical combiner and subjected to an interleaved superposition in time. Then, an ultrahigh-rate optical pulse sequence is generated at the output of the optical packet rate multiplication unit, as shown in FIG. 7(j). The output contains unwanted additional optical pulse signal pattern, beside the desired K-bit ultrahigh-rate optical packet.

As mentioned above, the function of the "reference optical path" is to locate the last bit in the low-rate optical packet to the Kth time slot in the ultrahigh-rate optical packet to be generated, and the end point of this time slot is used as the end time of the desired ultrahigh-rate optical packet. Thus, all the K-bits of the desired ultrahigh-rate optical packet will all appear at the K continuous time slots before the end point. Thus, only an electrooptical or all-optical time gate component needs to be cascaded with the output of the basic optical packet rate multiplication unit so as to correctly select the ultrahigh-rate optical packet, whose rate has been multiplied and whose duration has been shortened to be $K\tau$, under the control of a gating signal. Once the K-bit ultrahigh-rate optical packet has completely passed the time gate, the gating signal will put the time gate into an "off" state immediately. Depending on the actual applications, the time gate component may be made of a commercialized electrooptical intensity modulator or electrooptical switch, or an all-optical time gate formed of an ultrafast optical logic AND gate.

Although it is easy and cheap in implementation, the basic optical packet rate multiplication unit has a problem associated with the usage of the passive optical devices. That is, if the duration $K\tau$ of the rate-multiplied optical packet exceeds the period $1/B_i$ of the original packet before the rate multiplication, the time gate component driven by the gating signal will pass not only the desired optical packet but also part of the bits of the optical pulse sequence pattern before and/or after the desired optical packet. Thus, the part which should have been eliminated also appears at the output of the time gate along with the desired signal. To overcome such defect, the present invention provides a refined optical packet rate multiplication unit as follows.

3.1.2 Refined Optical Packet Rate Multiplication Unit of All-Parallel Structure By using active optical devices, the refined all-parallel optical packet rate multiplication unit guarantees that the input/output signal to/from each parallel optical path contains only one ultrashort optical pulse during rate multiplication for each low-rate optical packet, as shown in FIGS. 8(a) and 8(b). After these delayed optical pulses are superposed by a passive optical combiner, the output signal is exactly an ultrahigh-rate optical packet having a length of K bits, as shown in FIG. 9(j). In order to convert the serial K bits of the input low-rate optical packet into K parallel bits, a 1×K electrooptical switch may be used at the input of the refined optical packet rate multiplication unit to split the input K serial bits into K parallel paths of single bit, as shown in FIG. 8(a). The operating speed of the electrooptical switch is identical with the rate $B_i$ of the input low-rate optical packet. For a convenient description of its operating principle, it is assumed that the first output port of the 1×K electrooptical switch is connected to the "reference optical path", i.e., the first optical path, and the jth output port thereof is connected to the jth optical path. In this case, the optical signal from the jth output port of the electrooptical switch is just the (K−j+1)th bit of the low-rate optical packet, where $j=1, 2 \ldots, k$. Then, the K parallel paths of single bit are fed to K parallel optical paths designed by Equation (4). Each of the optical paths except the "reference optical path" includes a VODLM so as to generate the time delays $\Delta t_j^{(i)}$ determined by Equation (3). As a result, the output signal from the jth optical path is right located at the (K−j+1)th time slot of the ultrahigh-rate optical packet to be generated. The output signals from the K parallel optical paths are then superposed by a passive optical combiner. In this way, the ultrahigh-rate data signal generated after the above all-optical rate multiplication is exactly the desired optical packet having a period of $\tau=1/f_{op}$ and a length of K bits, as shown in FIG. 9(j).

Alternatively, as shown in FIG. 8(b), a passive optical splitter and a passive optical combiner are provided at the input and output stages of the all-parallel optical data packet rate multiplication unit, respectively, while K electrooptical intensity modulators or K simple electrooptical switches are provided on the K parallel optical paths between the input and output stages, respectively, to select out K parallel paths of single bit. As such, the ultrahigh-rate data signal generated after the above all-optical rate multiplication is exactly the desired optical packet having the period of $\tau=1/f_{op}$ and the length of K bits. Here, the operating speed of the electrooptical intensity modulators or the simple electrooptical switches is identical with the rate $B_i$ of the input low-rate optical packet.

Compared with the above basic optical packet rate multiplication unit, the refined optical packet rate multiplication unit of all parallel structure has a higher cost and larger size and needs more control signals, due to the usage of more active optical devices. On the other hand, such refined optical packet rate multiplication unit can output directly the desired optical packet having the rate of $f_{op}=1/\tau$ and the length of K bits. And the duration $K\tau$ of the rate-multiplied optical packet may be greater than, equal to or even less than the period $1/B_i$ of the original packet before the rate multiplication.

3.2 All-Serial Structure

Figure 10:
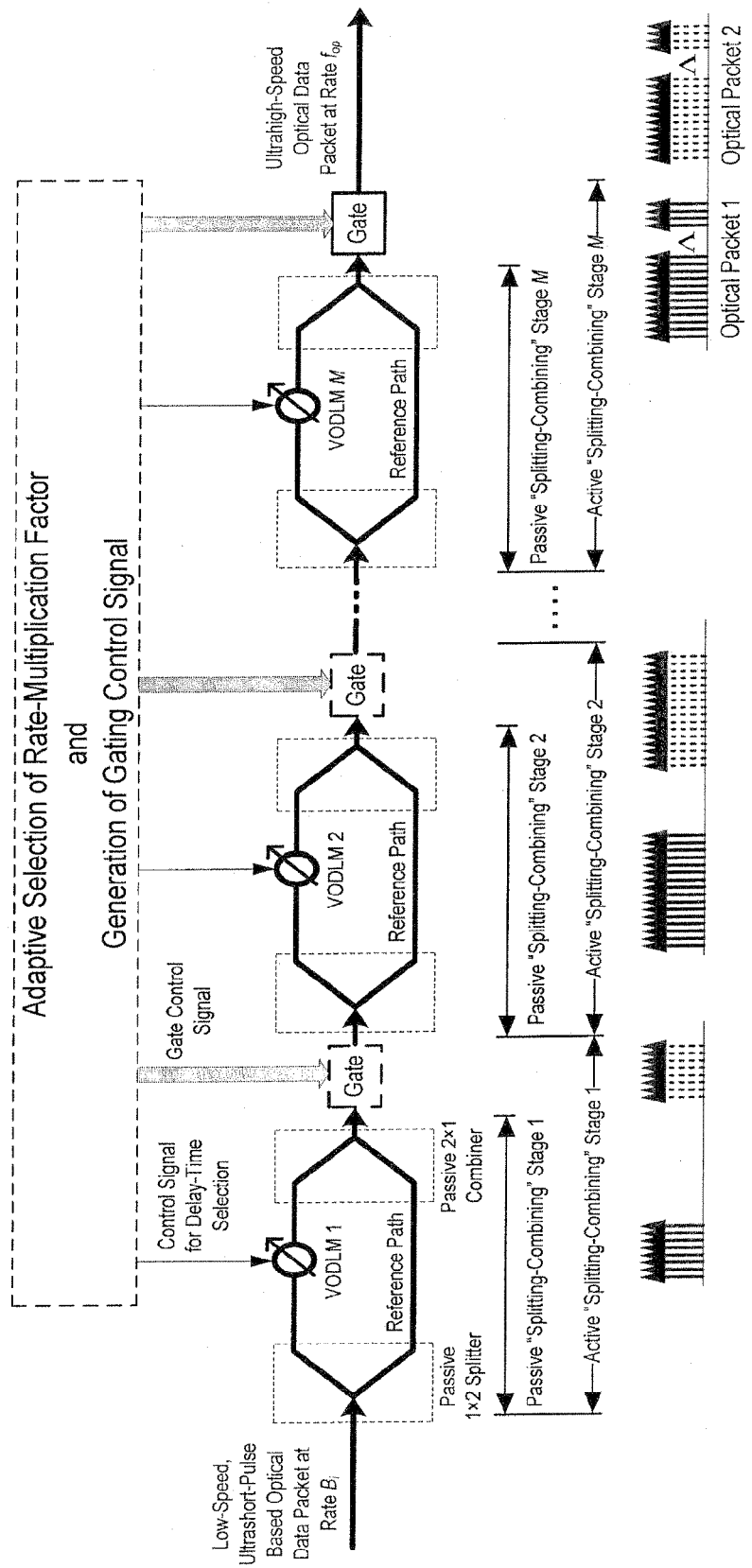
FIG. 10 is a schematic diagram showing the principle of an optical packet rate multiplication unit of an all-serial structure according to the present invention.

Although the above all-parallel optical packet rate multiplication unit may be used in rate multiplication of a low-rate optical packet having K of any value, such rate multiplication unit will increase in complexity, size and cost as the value of K increases. If the original optical packet has a length of K bits, and the following condition is satisfied $$K=2^M \quad (8)$$

where M≧1 is an integer, then an all-serial structure may be used in the present invention to effectively form the optical packet rate multiplication unit, as shown in FIG. 10. One of its significant features is that it is formed by serially connecting M stages of optical "split/combine" basic units, with each "split/combine" basic unit comprising a pair of optical splitter and combiner as well as a pair of optical delay lines, one of which is only used as a "reference optical path", as shown in FIG. 10. Further, the all-serial optical packet rate multiplication unit may be classified into two categories, basic and refined, depending on whether all the "split/combine" basic units are cascaded directly or part or all of them are cascaded via an active optical device. Using such all-serial optical packet rate multiplication unit will remarkably reduce the complexity in structure and difficulty in implementation, when the value K is very large.

The all-serial optical packet rate multiplication unit operates in the same principle as that of the all-parallel optical packet rate multiplication unit. That is, the rate multiplication unit relocates in time domain all the K bits of the input optical packet having the rate $B_i$ and the pulse width $\Delta P$ according to the time amount to be shortened for the period as determined in Equation (2), so as to generate the ultrahigh-rate optical packet having the length of K bits and the period of $\tau=1/f_{op}$. After that, the rate multiplication factor may be obtained as determined in Equation (1). In processing the input optical packet, the all-serial optical packet rate multiplication unit subjects the associated data bits to relative delay processing in pairs or in groups through each stage of "split/combine" basic unit, instead of applying time delay to each of the K bits separately.

To facilitate the description of the operating principle of the all-serial optical packet rate multiplication unit, it is assumed that the first stage of "split/combine" basic unit functions to group the first and second bits, the third and fourth bits, the fifth and sixth bits, . . . , and the $(2^M-1)$th and $2^M$th bits of the input optical packet into respective "pairs of adjacent bits", respectively. Based on the output optical signal from the first stage of basic unit, the second stage of "split/combine" basic unit groups the first to fourth bits into a "group of adjacent bits", the fifth to eighth bits into a further "group of adjacent bits", . . . , and the $(2^M-3)$th to $2^M$th bits into the last "group of adjacent bits". Similarly, the third stage of "split/combine" basic unit groups the first to eighth bits of the input optical packet into a "group of adjacent bits", the ninth to sixteenth bits into a further "group of adjacent bits", . . . , and the $(2^M-7)$th to $2^M$th bits into the last "group of adjacent bits". In conclusion, the jth stage of "split/combine" basic unit groups the first to $2^j$th bits of the input optical packet into a "group of adjacent bits", the $(2^j+1)$th to $2^{j+1}$th bits into a further "group of adjacent bits", . . . , and the $(2^M-2^j+1)$th to $2^M$th bits into the last "group of adjacent bits", where j=1, 2, . . . , M. Any two adjacent data bits within these "groups of adjacent bits" will have the same time interval $\tau$, if the compression on time interval is conducted according to the value $\Delta T_i$ determined in Equation (2). As a result, the desired optical packet with its rate uplifted to $f_{op}=1/\tau$ may be obtained at the output of the Mth stage of "split/combine" basic unit. Correspondingly, the delay optical path of the first stage of "split/combine" basic unit should have an additional time delay $\Delta s_1^{(i)}=\Delta T_i$ over the "reference optical path" thereof. Generally, the jth stage of "split/combine" basic unit has a longer delay optical path than the "reference optical path" thereof by a time delay $\Delta s_j^{(i)}$ $$\Delta s_j^{(i)} = 2^{j-1}\Delta T_i, j=1, 2, 3, \ldots, M \quad (6)$$

where $\Delta T_i$ is the time amount to be shortened for the period of the data packet of the rate $B_i$ as determined in Equation (2). The length of the delay optical path at each stage of "split/combine" basic unit, except the "reference optical path", must be adjusted with the change in the rate of the input optical packet, in order to perform an adaptive rate multiplication of the optical packet. Similar to the case of all-parallel optical packet rate multiplication unit, a circuit for selecting an adaptive rate multiplication factor first generates a corresponding optical distance selection control signal based on the calculated $RM_i$ and sends the signal to control M VODLMs to generate M desired optical distances. Therefore, the delay optical path of the jth stage of "split/combine" basic unit is longer than the "reference optical path" thereof by an optical distance $\Delta l_j^{(i)}$ $$\Delta l_j^{(i)} = \frac{c}{n}\Delta s_j^{(i)} \quad (7)$$
$$= \frac{2^{j-1}c\tau}{n}(RM_i - 1),$$
$$i \in \{1, 2, \ldots, n\};$$
$$j = 1, 2, \ldots, M$$

The VODLMs may be designed with reference to Equation (6) and the structure shown in FIG. 5.

The all-serial optical packet rate multiplication unit has two types, basic and refined, as the case of all-parallel optical packet rate multiplication unit.

3.2.1 Basic Optical Packet Rate Multiplication Unit of All-Serial Structure

Figure 11:
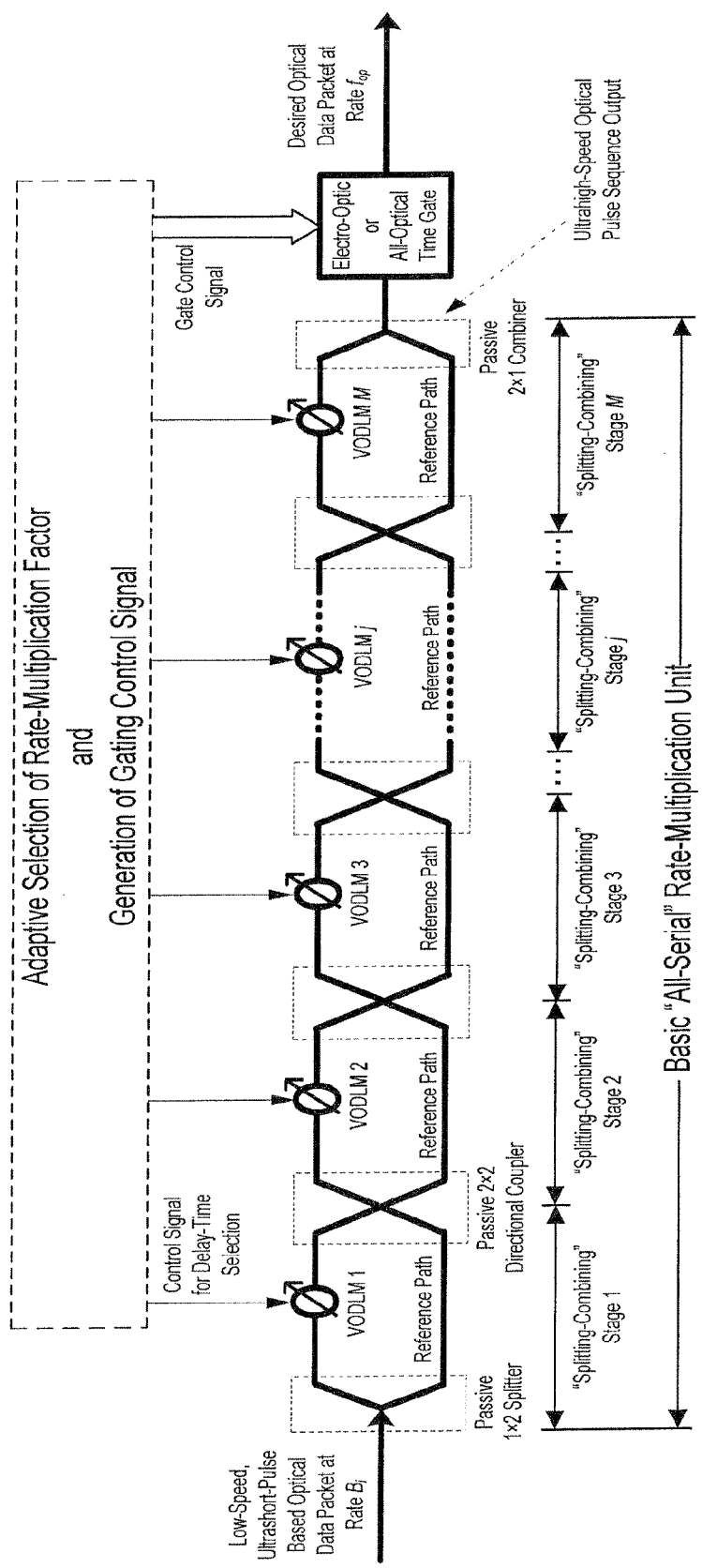
FIG. 11 is a schematic diagram showing the principle of a basic optical packet rate multiplication unit of an all-serial structure according to the present invention.
Figure 12:
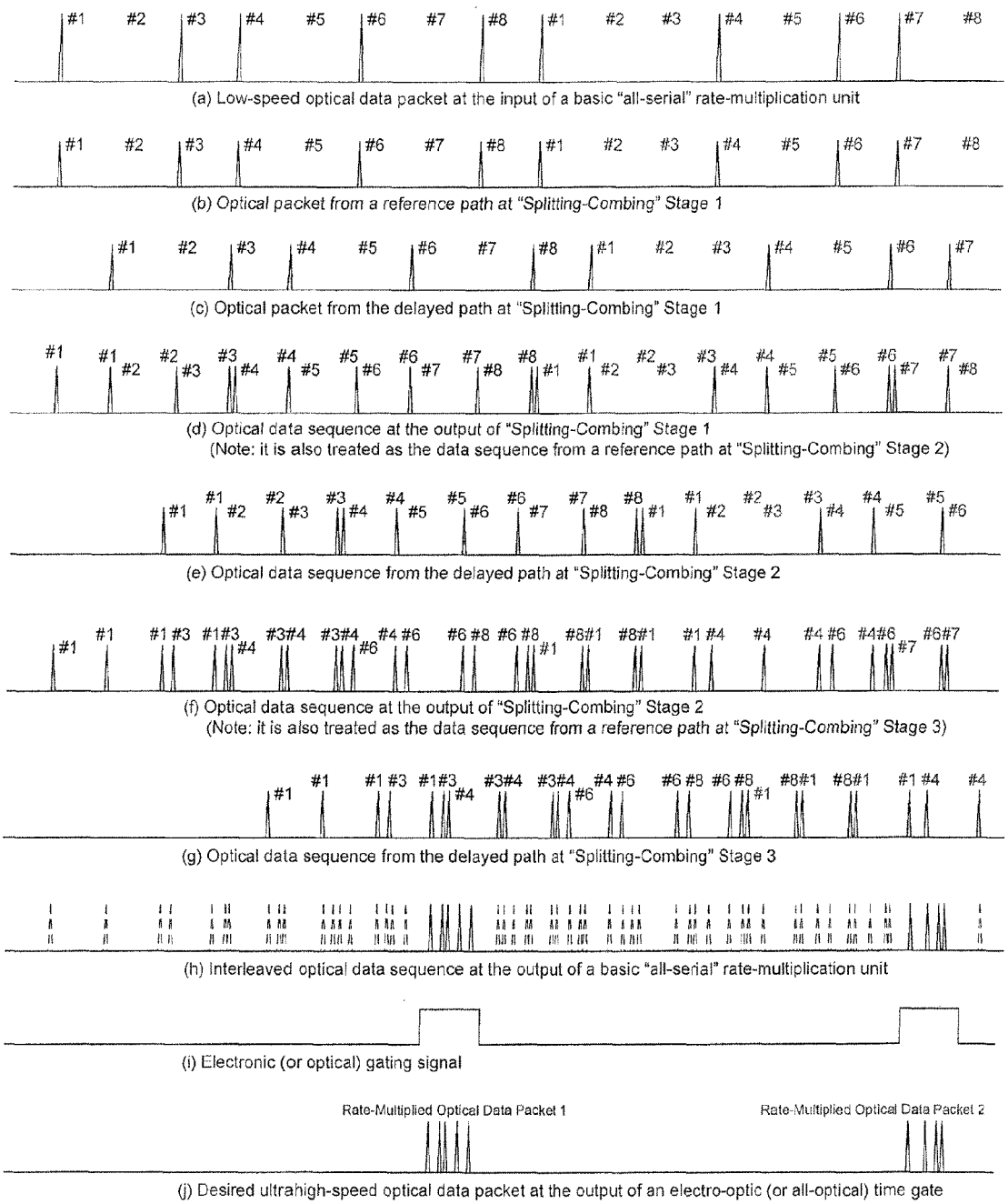
FIG. 12 is a schematic diagram showing a process of forming ultrahigh-rate optical packets by an improved "serial" rate multiplication unit according to the present invention.

The basic optical packet rate multiplication unit of all-serial structure is formed of passive optical devices, except the VODLMs. Since a pair of serially-connected passive optical 2×1 combiner and 1×2 splitter may be replaced with a passive optical 2×2 directional coupler, the basic optical packet rate multiplication unit may have the structure as shown in FIG. 11. Each stage of "split/combine" basic unit processes the signal at the input of the rate multiplication unit according to the time delay $\Delta s_j^{(i)}$ determined in Equation (6), with the signal being an optical packet having the rate of $B_i$, the pulse width of $\Delta P$ and the length of $K=2^M$ bits. FIG. 12 shows an example that the first to third stages of "split/combine" basic unit process the input optical packet of a length of 8 bits, with M=3. Due to the use of the passive optical 2×2 directional couplers, the ultrahigh-rate optical pulse sequence formed after interleaved superposition in time contains the desired $2^M$-bit ultrahigh-rate optical packet as well as some unwanted optical pulse patterns, as shown in FIG. 12(h). For this reason, an electrooptical or all-optical time gate component needs to be cascaded after the output of the basic optical packet rate multiplication unit so as to correctly select the ultrahigh-rate optical packet under the control of a gating signal. The time gate will be set in an "off" state by the gating signal as soon as the $2^M$-bit ultrahigh-rate optical packet passes the time gate.

As a common problem with all basic optical packet rate multiplication units, if the duration $2^M\tau$ of the rate-multiplied optical packet exceeds the period $1/B_i$ of the original packet before the rate multiplication, the time gate component driven by the gating signal will pass not only the desired optical packet but also part of the bits of the optical pulse sequence pattern before and/or after the desired optical packet. Thus, the part which should have been eliminated also appears at the output of the time gate along with the desired signal. To overcome such defect, the present invention provides a refined optical packet rate multiplication unit as follows.

3.2.2 Refined Optical Packet Rate Multiplication Unit of All-Serial Structure

For the refined optical packet rate multiplication unit of all-serial structure, an electrooptical or all-optical time gate component may be cascaded at the output of each stage of the "split/combine" basic units or at the output of each of some selected "split/combine" basic units, as shown in FIG. 10. Under the control of a gating signal, each of the time gate components eliminates timely any unwanted optical pulses or invalid "pairs of adjacent bits"/"groups of adjacent bits", which result from the optical process of "split-delay-combine", at relevant intermediate stages, selects only the desired "pairs of adjacent bits" or "groups of adjacent bits" and inputs them into next stage of "split/combine" basic unit. With such processing, there is always a sufficient time interval between any desired "pairs of adjacent bits"/"groups of adjacent bits". As a result, the duration $2^M\tau$ of the ultrahigh-rate optical packet at the output of the last stage of "split/combine" basic unit may be greater or less than the period $1/B_i$ of the original packet before the rate multiplication. Accordingly, the problem of limited optical packet length due to the use of basic optical packet rate multiplication unit can be overcome. On the other hand, such solution is at the expense of increase in the cost, due to the use of time gate components and their control circuits.

Figure 13:
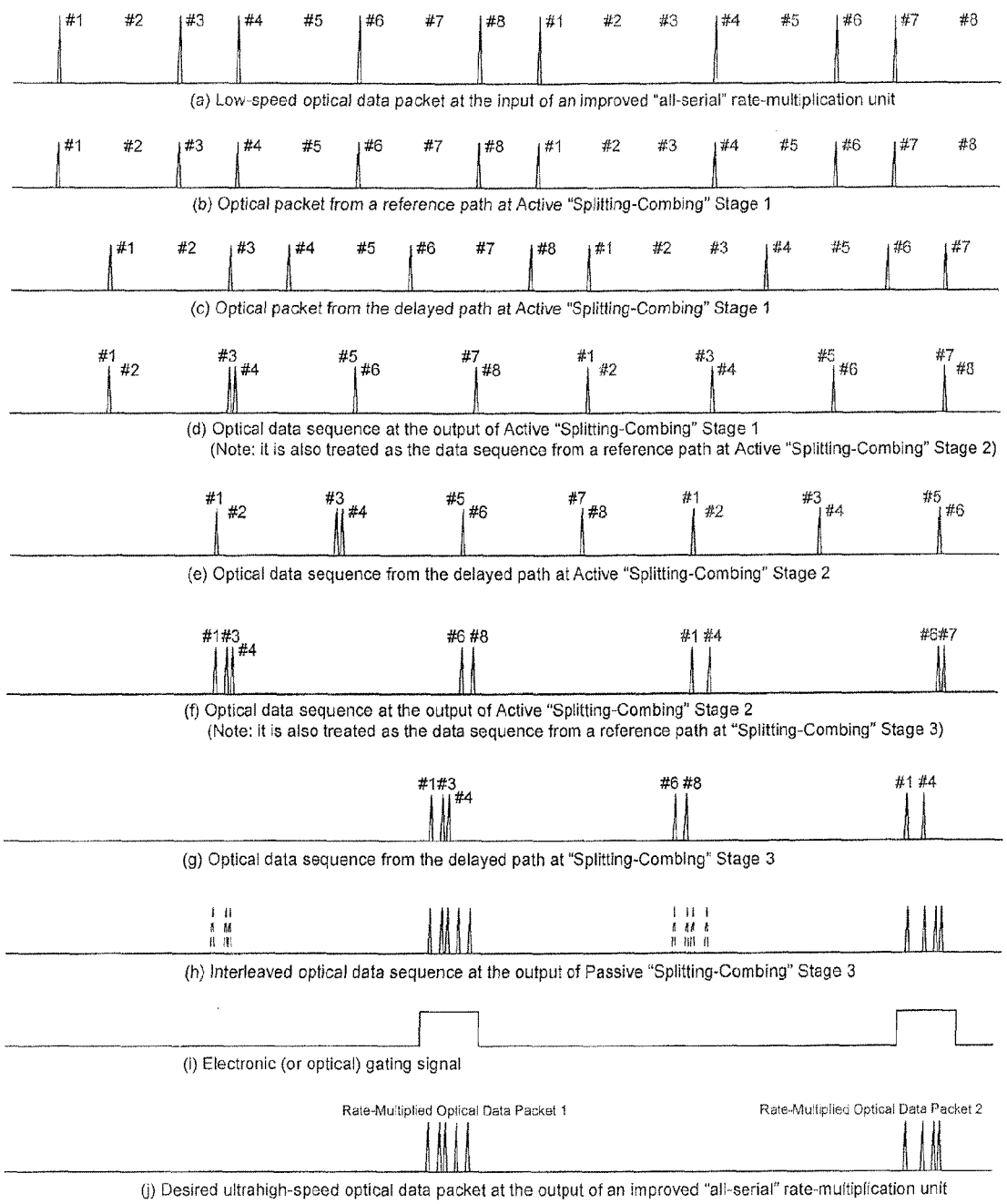
FIG. 13 is a schematic diagram showing a process of forming ultrahigh-rate optical packets by an electrooptical (or all-optical) gate according to the present invention.

FIG. 13 gives an example with M=3. Unlike the optical signals outputted from the stages in the basic all-serial optical packet rate multiplication unit as described above, four "pairs of adjacent bits" formed of the first and second bits, the third and fourth bits, the fifth and sixth bits, the seventh and eighth bits, respectively, may be selected having a large time interval between each other, as shown in FIG. 13(d), if a time gate component is cascaded at the output of the first stage of "split/combine" basic unit. If a time gate component is also cascaded at the output of the second stage of "split/combine" basic unit, the optical pulse sequence signal, which is selected by the gating signal and inputted to the last stage of "split/combine" basic unit, will contain only a "group of adjacent bits" formed of the first to fourth bits and a further "group of adjacent bits" formed of the fifth to eighth bits. The time interval between them is even larger, as shown in FIG. 13(f). In this way, the duration of the ultrahigh-rate optical packet at the output of the last stage of "split/combine" basic unit will exceed $1/B_i$. With the gating signal for the last stage, the refined optical packet rate multiplication unit outputs only the ultrahigh-rate optical packet having the length of $2^M$ bits and exactly corresponding to the input optical packet at the rate $B_i$, as shown in FIG. 13(j). In projects and applications, the time gate component may be cascaded at the outputs of some selected "split/combine" basic units as necessary, in order to reduce cost and implementation complexity. For example, the first time gate component may be cascaded at the second stage of "split/combine" basic unit. In this case, as shown in FIG. 13(f), the optical pulse sequence signal inputted to the third stage of "split/combine" basic unit contains only two "groups of adjacent bits", which are spaced by a large interval and formed of the first to fourth bits and the fifth to eighth bits, respectively. Again, the correct ultrahigh-rate optical packet may be obtained at the output of the refined optical packet rate multiplication unit, as shown in FIG. 13(j).

3.3 Serial-Parallel Hybrid Structure

As discussed in Section 3.1, although the all-parallel optical packet rate multiplication unit may be used in rate multiplication of a low-rate optical packet having K of any value, such rate multiplication unit will increase in complexity, size and cost as the value K increases, as shown in FIG. 4. Such defect can be overcome by use of the all-serial optical packet rate multiplication unit, but the input optical packet to be processed by such rate multiplication unit must has a length of $2^M$, where M≧1 is an integer. In a practical system or network, the length of K bits of the original optical packet may not satisfy the requirement of $K=2^M$, for example, in the case of ATM network. This hampers the application of the cost-efficient all-serial optical packet rate multiplication unit to the case of $K\ne 2^M$. To address such problem and thus promote the application of all-optical packet rate multiplication technique, a serial-parallel hybrid structure is provided taking into account the advantages of the above all-serial and all-parallel optical packet rate multiplication units. Such optical packet rate multiplication unit has a simple structure, a small size and a low cost as well as the capability of processing any optical packet with $K\ne 2^M$. The fundamental principle of its operation may be explained with reference to the description about the all-serial and all-parallel optical packet rate multiplication units in Sections 3.1, 3.2.

Figure 14:
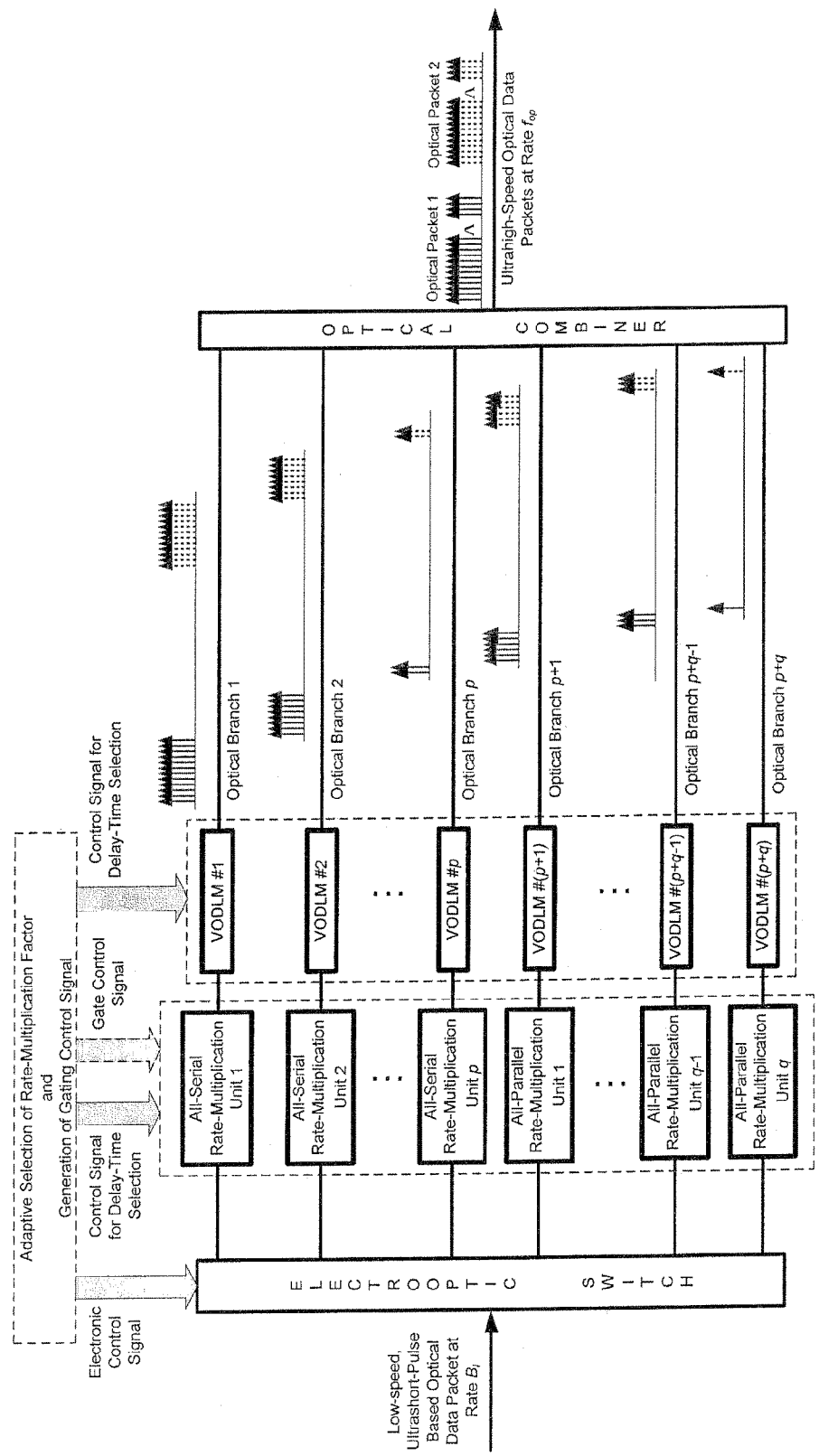
FIG. 14 is a schematic diagram showing a process of forming ultrahigh-rate optical packets by an improved "serial" rate multiplication unit according to the present invention.
Figure 15:
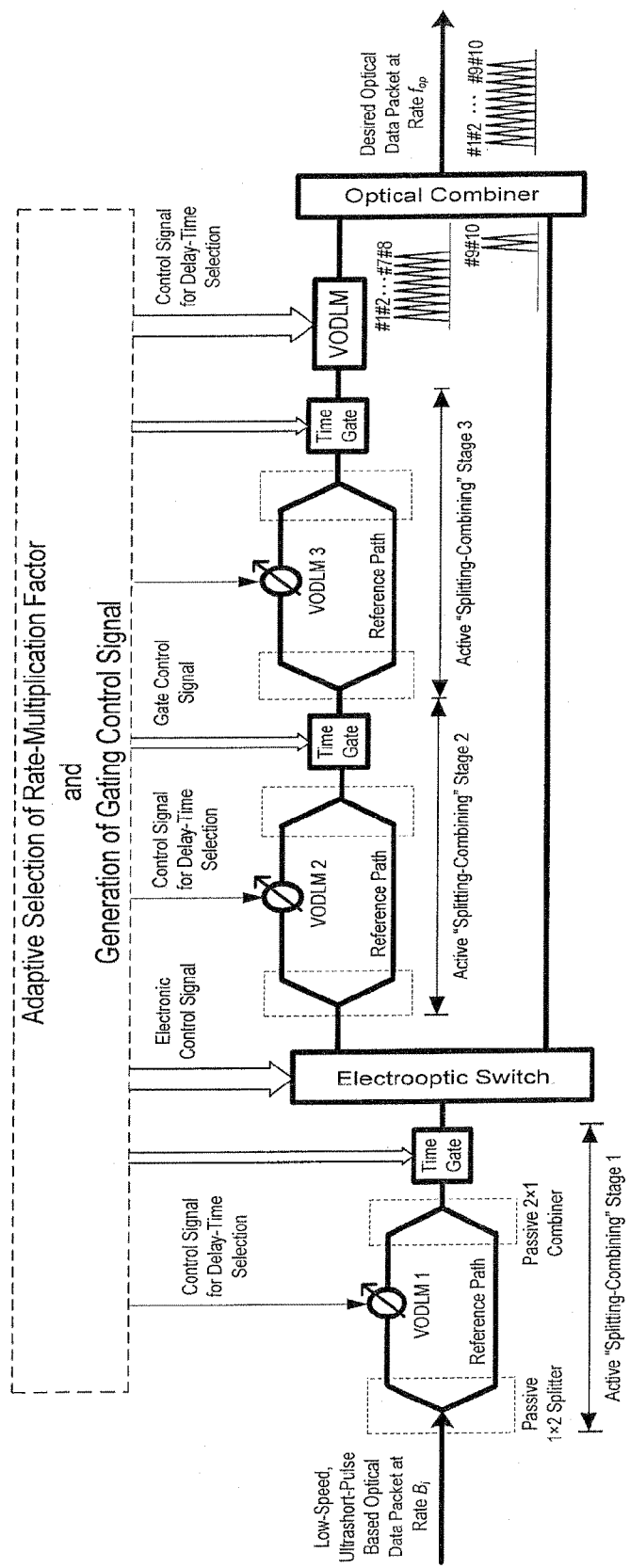
FIG. 15 is a schematic diagram showing the principle of an optical packet rate multiplication unit of a serial-parallel hybrid structure according to the present invention.

The optical packet rate multiplication unit of serial-parallel hybrid structure may be realized in two major forms. In the first form, the backbone is a parallel structure, with each of all or part of the parallel optical paths being inserted with an all-serial optical packet rate multiplication unit depending on practical requirements, as shown in FIG. 14. Here, the simplest all-serial optical packet rate multiplication unit may be just a mono-stage of "split/combine" basic unit, and the simplest all-parallel optical packet rate multiplication unit may contain only one optical delay line, i.e., there is only a single delay optical path. The second form is taking the serial structure as the backbone, with an all-serial optical packet rate multiplication unit and a parallel optical branch being connected in parallel at the output of the first stage of "split/combine" basic unit, depending on practical requirements. FIG. 15 shows an example with M=10. When the low-rate optical packet of 10 bits is inputted to the optical packet rate multiplication unit of serial-parallel hybrid structure, the time gate component cascaded at the output of the first stage of "split/combine" basic unit may select five "pairs of adjacent bits", which are formed of the first and second bits, the third and fourth bits, the fifth and sixth bits, the seventh and eighth bits, the ninth and tenth bits, respectively. And there is a large time interval between any two of these pairs. Under the control of a control unit, the electrooptical switch feeds the first four "pairs of adjacent bits" into the second stage of "split/combine" basic unit on the first parallel optical branch, while the last "pair of adjacent bits" is fed into the second parallel optical branch. Thus, the time gate for the third stage of "split/combine" basic unit outputs an ultrahigh-rate optical data signal sequence formed of the first to the eighth bits, as shown in FIG. 13(*j*) and FIG. 15. Having undergone the proper delay processing by a VODLM, the sequence is superposed to another optical data signal sequence (the "pair of adjacent bits" formed of the ninth and tenth bits) from the second parallel optical branch in a passive optical combiner. As such, an ultrahigh-rate optical packet is generated having a length of 10 bits and a new period of $\tau=1/f_{op}$, as shown in FIG. 15. As required, the optical packet rate multiplication unit of serial-parallel hybrid structure may have an all-serial optical packet rate multiplication unit and a parallel optical branch connected in parallel at the output of the rth stage of "split/combine" basic unit, where r<M.

K may be expressed as $K=2^4+2$ when K=18, and the corresponding value of p is 2. In this case, the structure in FIG. 14 may be used, and it is possible to rate-multiply the input optical packet having a rate $B_i$ and a length of 18 bits only by two all-serial optical packet rate multiplication units. Under the control of a control signal, the electrooptical switch at the input feeds the first to sixteenth bits of the input optical packet into the first parallel optical path. This path contains an all-serial optical packet rate multiplication unit formed of four stages of "split/combine" basic units as well as a VODLM #1 to perform rate multiplication on the first sixteen bits of the input optical packet. Then, the electrooptical switch feeds the last two bits of the input optical packet into the second parallel optical path, which contains only a single stage of "split/combine" basic unit to perform rate multiplication on the last two bits. Finally, by a correct delay control over the VODLM on the first parallel optical path, the data sequences from the first and the second parallel optical paths are superposed by a passive optical combiner to generate an ultrahigh-rate optical packet having a length of 18 bits and a new period of $\tau=1/f_{op}$.

4. Acquisition of Ultrahigh-Rate Optical Packet

Figure 8:
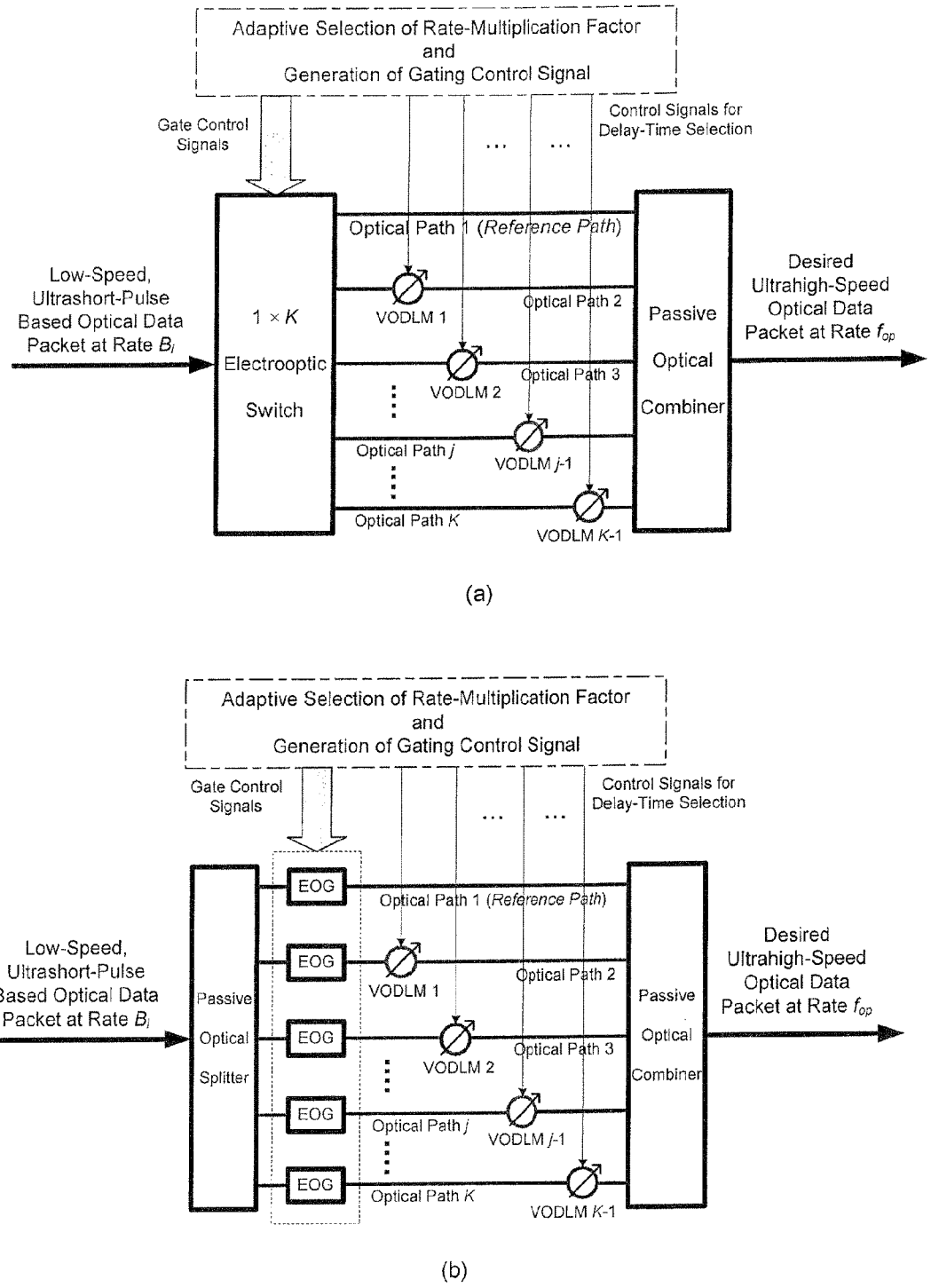
FIG. 8 is a schematic diagram showing two embodiments of a refined all-parallel optical packet rate multiplication unit according to the present invention.
Figure 9:
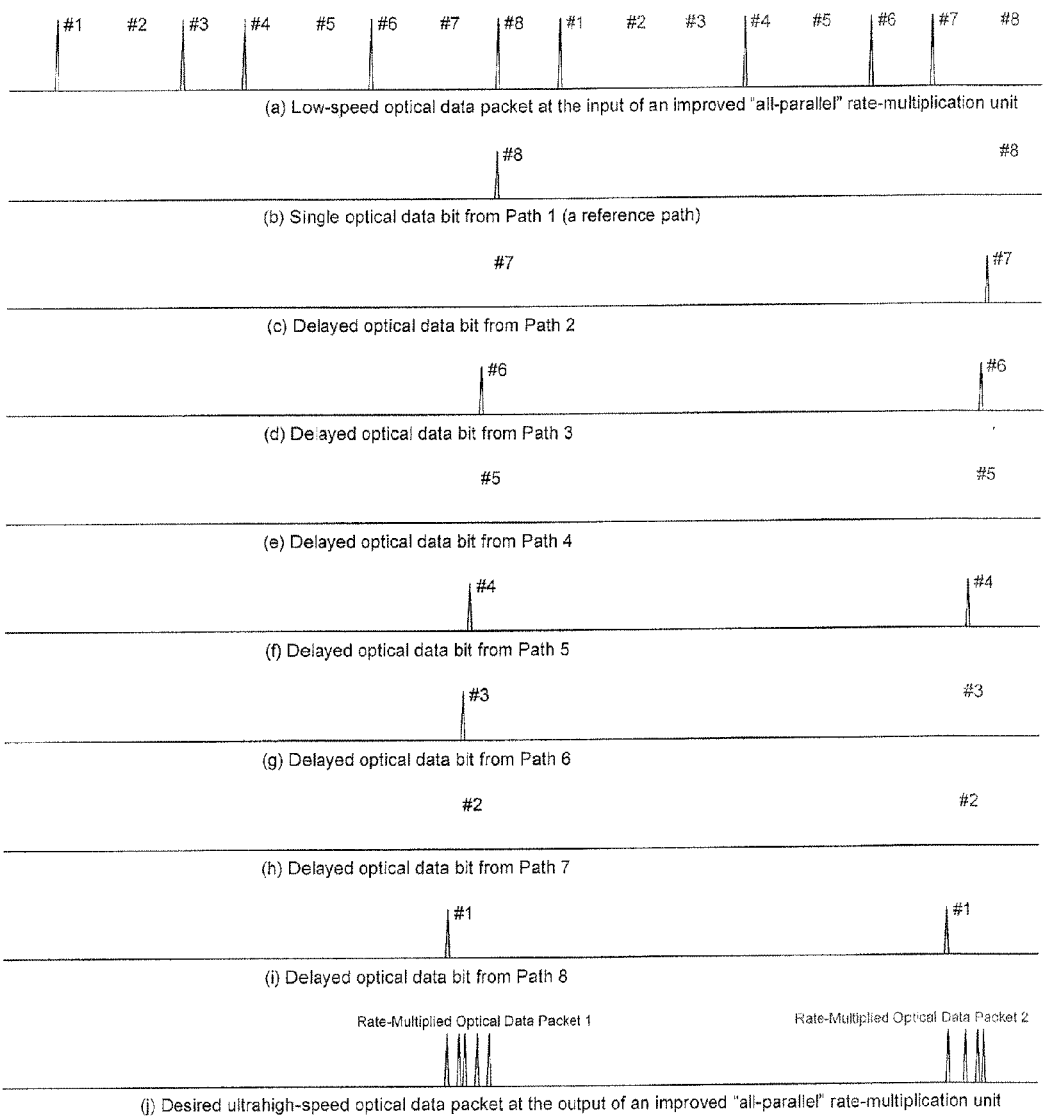
FIG. 9 is a schematic diagram showing a process of forming ultrahigh-rate optical packets by an improved "all-parallel" rate multiplication unit according to the present invention.

To enable the rate multiplication of a low-rate input optical packet, a gating signal is required to impose a correct "on" time control on the relevant electrooptical switch devices, electrooptical or all-optical time gate components inside the optical packet rate multiplication unit, whether the rate multiplication unit is of all-parallel structure as shown in FIGS. 4, 6, 8, or all-serial structure as shown in FIGS. 10, 11, or serial-parallel hybrid structure as shown in FIGS. 14, 15. This can ensure that each output signal from the rate multiplication unit always corresponds to each low-rate optical packet at the input of the rate multiplication unit, and the rate of the output signal is exactly $RM_i$ times as high as that of the input signal. As a result, a time gate control signal generator needs to be used for providing a desired electronic or optical control signal to each of the associated electrooptical switch devices, electrooptical or all-optical time gate components. Also, the time gate control signal generator should be synchronized with the low-rate optical packet inputted to the rate multiplication unit. In this case, after a proper delay processing, the provided gating signal can guarantee that each bit of the input optical packet is fed into a corresponding optical path, or that the desired ultrahigh-rate optical packet or data sequence is screened out at the time gate component at the output or the intermediate stage of the rate multiplication unit.

What is claimed is:

1. An ultrahigh-speed adaptive and all-optical method for data packet rate multiplication compatible with multiple data rates, comprising steps of:
   (1) Pulse width compression on low-rate data packet;
   (1.1) generating an ultrashort optical pulse sample sequence: using an ultrashort-pulse laser source that can be synchronized with an external data clock to generate a periodic ultrashort optical pulse sample sequence at a repetition frequency of $B_i$ ($i \in \{1, 2, \ldots, n\}$);
   (1.2) subjecting an original low-rate electronic data packet and the periodic ultrashort optical pulse sample sequence at the repetition frequency of $B_i$ to ultrafast electrooptical sampling and then generating an original low-rate optical data packet which is based on ultrashort pulses and at a rate of $B_i$; or subjecting an original optical data packet and the periodic ultrashort optical pulse sample sequence at the repetition frequency of $B_i$ to all-optical sampling and then generating an original low-rate optical data packet which is based on ultrashort pulses and at a rate of $B_i$,
   (2) Selecting an adaptive rate multiplication factor
   (2.1) calculating a rate multiplication factor $RM_i$ for the data packet adaptively based on the rate $B_i$ of the original low-rate data packet and a rate $f_{op}$ of an ultrahigh-rate optical data packet to be reached after the multiplication, $$RM_i = \frac{f_{op}}{B_i} \quad (1)$$

where $i \in \{1, 2, \ldots, n\}$, and $RM_i$ is any value greater than 1,
   (2.2) determining a time amount $\Delta T_i$ to be shortened in the compression process, $$\Delta T_i = \frac{1}{B_i} - \frac{1}{f_{op}} \quad (2)$$
$$= (RM_i - 1)\tau$$

where $$\tau = \frac{1}{f_{op}}$$

is the period of a compressed optical data packet,
   (3) Compressing the period of the original low-rate optical data packet: compressing the period of the original low-rate optical data packet by an optical data packet rate multiplication unit according to the time amount $\Delta T_i$ to be shortened for the period as determined in Equation (2), so as to convert the low-rate optical data packet at the rate $B_i$ into a plurality of ultrahigh-rate optical data packets at the rate $f_{op}$, wherein only one of the plurality of ultrahigh-rate optical data packets maintains an original correct frame structure, and the rest are of erroneous frame structure, (4) Acquiring the ultrahigh-rate optical data packet of the correct frame structure: screening out the ultrahigh-rate optical data packet of the correct frame structure at an output of the optical data packet rate multiplication unit with an optical gating signal.

2. The method according to claim 1, wherein the optical data packet rate multiplication unit has an all-parallel structure, and is adapted to:

(1) split an input optical data packet having a rate of $B_i$, a pulse width of $\Delta P$ and a packet length of K bits into K paths, (2) inject the split signals into K parallel optical paths, respectively, and impose a delay on each path, wherein the time delay $\Delta t_j^{(i)}$ for the jth optical path is $$\Delta t_j^{(i)} = (j-1)\Delta T_i \qquad (3)$$

where j=2, 3, . . . , K, wherein the jth optical path in the all-parallel optical data packet rate multiplication unit is longer than a reference optical path by an optical distance $\Delta L_j^{(i)}$ $$\Delta L_j^{(i)} = \frac{c}{n}\Delta t_j^{(i)} \qquad (4)$$
$$= \frac{c\tau}{n}(j-1)(RM_i - 1)$$

where c is light velocity in vacuum, n is refractive index of optical waveguide material, j=1, 2, . . . , K, and i∈{1, 2, . . . , n}, wherein the relative delay optical distance $\Delta L_{basic}^{(i)}$ between the jth optical path and the (j+1)th optical path is $$\Delta L_{basic}^{(i)} = \Delta T_i \times \frac{c}{n} \qquad (5)$$

where j∈{1, 2, . . . , K-1}, (3) combine and output the K parallel optical paths.

3. The method according to claim 2, wherein the optical data packet rate multiplication unit has an all-parallel structure, when inputted into the optical data packet rate multiplication unit, the optical data packet having the rate of $B_i$, the pulse width of $\Delta P$ and the packet length of K bits is first split into K paths by a passive optical splitter and then fed to the K parallel optical paths, wherein the optical data packet on each of the optical paths is subjected to a delay determined by the time delay $\Delta t_j^{(i)}$ from Equation (3)

$$\Delta t_j^{(i)} = (j-1)\Delta T_i \qquad (3)$$

where j=2, 3, . . . , K, then the delayed K paths of optical data packets are inputted to a passive optical combiner and subjected to an interleaved superposition in time, finally an ultrahigh-rate optical pulse sequence is generated at the output of the optical data packet rate multiplication unit.

4. The method according to claim 2, wherein the optical data packet rate multiplication unit has an all-parallel structure, in which:

the optical data packet rate multiplication unit multiplies each low-rate optical data packet by an active optical device, the input or output signal of each of the parallel optical paths contains only one ultrashort optical pulse, and a 1×K electrooptical switch is provided at the input of the optical data packet rate multiplication unit to split an input K-bit serial data into K parallel paths of single bit data signal;

alternatively, a passive optical splitter and a passive optical combiner are provided at the input and output stages of the optical data packet rate multiplication unit, respectively, while K electrooptical intensity modulators or K simple electrooptical switches are provided on the K parallel optical paths between the input and output stages, respectively, to select K parallel paths of single bit data signal; and the optical data packet rate multiplication unit outputs directly the optical data packet having the desired rate of $f_{op}=1/\tau$ and length of K bits.

5. The method according to claim 1, wherein the optical data packet rate multiplication unit has an all-serial structure, in which a jth stage of "split/combine" basic unit has a longer delay optical path than a reference optical path thereof by a time delay $\Delta s_j^{(i)}$ $$\Delta s_j^{(i)} = 2^{j-1}\Delta T_i \qquad (6)$$

where $\Delta T_i$ is the time amount to be shortened for the period of the data packet of the rate $B_i$ as determined in Equation (2), and j=1, 2, 3, . . . , M;

the jth stage of "split/combine" basic unit has a longer delay optical path than the reference optical path thereof by an optical distance $\Delta l_j^{(i)}$ $$\Delta l_j^{(i)} = \frac{c}{n}\Delta s_j^{(i)} \qquad (7)$$
$$= \frac{2^{j-1}c\tau}{n}(RM_i - 1),$$

where i∈{1, 2, . . . , n}, and j=1, 2, . . . , M.

6. The method according to claim 5, wherein the optical data packet rate multiplication unit has an all-serial structure, to the input of which an optical data packet having a rate of $B_i$, a pulse width of $\Delta P$ and a packet length of $K=2^M$ bits is inputted and multiplied by each stage of the "split/combine" basic units according to the time delay $\Delta s_j^{(i)}$ determined as $$\Delta s_j^{(i)} = 2^{j-1}\Delta T_i \qquad (6)$$

where $\Delta T_i$ is the time amount to be shortened for period of the data packet of the rate $B_i$ as determined in Equation (2), and j=1, 2, 3, . . . , M.

7. The method according to claim 5, wherein the optical data packet rate multiplication unit has an all-serial structure, in which an electrooptical or all-optical time gate component is cascaded at the output of each stage of the "split/combine" basic units or at the output of each of some selected stage of "split/combine" basic units;

under the control of a gating signal, each of the electrooptical or all-optical time gate components eliminates timely any unwanted optical pulses or invalid "pairs of adjacent bits"/"groups of adjacent bits", which result from the optical process of "split-delay-combine", at relevant intermediate stages, and selects the desired "pairs of adjacent bits" or "groups of adjacent bits" and inputs them into next stage of "split/combine" basic unit.

8. The method according to claim 1, wherein the optical data packet rate multiplication unit has a serial-parallel hybrid structure, in which:

the backbone is the parallel structure, one or more parallel optical path thereof being inserted with an all-serial optical data packet rate multiplication unit; or the backbone is the serial structure, an all-serial optical data packet rate multiplication unit and a parallel optical branch being connected in parallel at the output of the first stage of "split/combine" basic unit.

\* \* \* \* \*